(12) United States Patent
Nakasu et al.

(10) Patent No.: US 6,867,841 B2
(45) Date of Patent: Mar. 15, 2005

(54) METHOD FOR MANUFACTURING LIQUID CRYSTAL DISPLAY PANELS

(75) Inventors: Nobuaki Nakasu, Kawasaki (JP); Hiroyasu Matsuura, Yokohama (JP); Toshiyuki Koshita, Chosei (JP); Mitsuaki Shiba, Mobara (JP); Hitoshi Azuma, Yokohama (JP); Yoshiteru Tomizuka, Mobara (JP); Tsuneo Okada, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/331,072

(22) Filed: Dec. 27, 2002

(65) Prior Publication Data

US 2004/0032563 A1 Feb. 19, 2004

Related U.S. Application Data

(63) Continuation-in-part of application No. 10/001,087, filed on Oct. 31, 2001.

(30) Foreign Application Priority Data

Jul. 1, 2002 (JP) ...................................... 2002-191585

(51) Int. Cl.[7] .............................................. G02F 1/13
(52) U.S. Cl. ................................................... 349/187
(58) Field of Search ........................................ 349/187

(56) References Cited

U.S. PATENT DOCUMENTS

| | | | |
|---|---|---|---|
| 4,654,621 A | * | 3/1987 | Sugiyama ....................... 338/5 |
| 5,386,309 A | * | 1/1995 | Nam ........................... 349/149 |
| 5,607,009 A | | 3/1997 | Turner et al. |
| 6,436,482 B2 | * | 8/2002 | Katsumata ................... 427/493 |
| 6,459,467 B1 | | 10/2002 | Hashimoto et al. |

FOREIGN PATENT DOCUMENTS

| | | | | |
|---|---|---|---|---|
| JP | 09-041139 | | 2/1997 | |
| JP | 11-030780 | * | 2/1999 | ......... G02F/1/1339 |
| JP | 11-337954 | * | 12/1999 | ......... G02F/1/1339 |
| JP | 2000-199908 | * | 7/2000 | ......... G02F/1/1339 |
| JP | 2002-110507 | | 4/2002 | |
| JP | 2002-169169 | | 6/2002 | |

* cited by examiner

*Primary Examiner*—Tarifur R. Chowdhury
*Assistant Examiner*—Jeanne Andrea Di Grazio
(74) *Attorney, Agent, or Firm*—Townsend and Townsend and Crew LLP

(57) ABSTRACT

The invention provides a high quality liquid crystal panel with low non-uniformity by enveloping a pair of glass substrates sandwiching an uncured thermosetting seal member with heat-resistant metal sheets, bringing the insides of the sheets into a substantially hermetically closed state to decompress the space around the substrates, pressing the glass substrates and the seal member by a pressure difference from the atmospheric pressure in a predetermined space created by the enveloping sheets, heating the sheets, the glass substrates and the seal member with a heater disposed at a position remote from the sheet and curing the seal member, and maintaining the gap between the pair of glass substrates to prevent non-uniformity of the gap between the pair of glass substrates constituting the liquid crystal panel.

9 Claims, 26 Drawing Sheets

(a)

(b)

BEFORE SOFTENING
SEAL MEMBER (c)

AFTER SOFTENING
SEAL MEMBER (a)

(b)

(c)

METHOD FOR MANUFACTURING LIQUID CRYSTAL DISPLAY PANELS

CROSS-REFERENCE TO RELATED APPLICATIONS

This is a continuation-in-part of U.S. patent application Ser. No. 10/001,087, filed Oct. 31, 2001, and entitled "Liquid Crystal Display Device and Method for Making."

BACKGROUND OF THE INVENTION

In a conventional liquid crystal display panel, liquid crystals are contained between two sheets of glass substrate. For a thin film transistor panel (TFT) type panel, a color filter, a transparent electrode and a thin film transistor are formed on surfaces of glass substrates and a gap between the glass substrates is maintained at a substantially constant distance by spacers.

Liquid crystal material between the substrates is hermetically sealed between the panels by a thermosetting resin. In manufacturing a liquid crystal display panel, a seal is provided between the sheets that contains the liquid crystals. Thereafter uniting the two sheets of the glass substrate creates a fused element. According to the process, in the display area, the seal is cured while being compressed. The spacers are brought into contact with the two glass substrates provide a uniform gap therebetween.

After curing of the seal, the sealed area is filled with liquid crystal material. When a thermosetting resin is used for the seal, according to conventional technology, the gap between the two sheets of glass substrates is made mainly by the following three systems: (1) a system of sandwiching and pressing the glass substrates with two flat heaters, (2) a system of placing the glass substrates in a pressure chamber and using the pressure difference between atmospheric pressure and a vacuum created by exhausting air from between the plates, and heating the glass substrates with a heater provided on the plate or with a furnace, and (3) a system of sandwiching the glass substrates with airtight sheets from both sides thereof pressing the glass substrates in a pressure chamber, as in the second method, and heating the glass substrates in a furnace. All of these are systems were developed to promote uniformity of the compressive force and for the two sheets of the glass substrates to be heated at the same temperature.

BRIEF SUMMARY OF THE INVENTION

Conventional technology poses several problems, which this invention resolves. According to system (1), when an area of the substrate is enlarged, a larger compressive force is needed and a large-sized manufacturing apparatus must be used. Therefore, the system is less suitable for manufacturing in a clean room. Because the glass substrates are rapidly heated and pressed, the air between the glass substrates may be incompletely exhausted causing non-uniformity in the space between the substrates. Further, if a vacuum is used for expediting the exhaust, the pressure between the airtight sheets is elevated, the seal is destroyed, or a shift is caused between the glass substrates.

According to system (2), when the plate is preheated, a temperature difference is produced between the glass substrates and the glass substrates are warped or shifted by thermal expansion. Further, if the compression plate is heated after placing the glass substrates, extra time is required to elevate the temperature of the plate. The same problems occur when processing the glass substrates with a furnace.

According to system (3), extra time is required to heat the plates.

Further, when two sheets of the glass substrates are to be overlapped, one of the glass substrates is formed with TFT elements and other is formed with a color filter. Therefore, different thin films are formed on the glass substrates. As a result, the thermal expansion coefficients of the two sheets of the glass substrates differ.

All of the methods of the above-described three systems involve a structure in which two sheets of glass substrate are heated to the same temperature when the thermosetting resin is cured. Therefore the two sheets of glass substrate are fixed in a state of different expansion amounts. As the substrates cool after curing the resin, the glass substrate having a larger thermal expansion coefficient shrinks, producing a warp in the liquid crystal panel, which can cause an integration error.

This invention prevents shifting or warping of substrates to prevent non-uniformity in the separation of the substrates. This is achieved by the following approach. One embodiment of the invention, provides a method of manufacturing a liquid crystal panel that includes a step of forming a composite glass substrate, the method including a first step of providing a thermosetting seal between the substrates; a second step of enveloping the glass substrates with sheets and bringing the space between the sheets into a substantially hermetically closed state; a third step of heating the sheets and the area between the sheets with heaters disposed at positions remote from the sheets and spaced apart from outer sides of the sheets by spacers, while exhausting the area inside the sheets; a fourth step of releasing the hot air inside the sheets to the atmosphere; and a fifth step of removing the sheets from the glass substrates.

Another embodiment provides a method of manufacturing a liquid crystal panel having a structure having a pair of glass substrates formed with a TFT element and a color filter on the respective glass substrates and a thermosetting resin surrounding the liquid crystal holding area sandwiched between the pair of glass substrates. The method includes a first step of forming a mark for overlapping at least one of the substrates in the pair of substrates; a second step of coating the thermosetting resin on one of the glass substrates; a third step of measuring and storing the coordinates of the mark formed on the at least one glass substrate; a fourth step of overlapping the two sheets of glass substrates to sandwich the thermosetting resin while positioning the glass substrates such that the relative positions of the marks provided on the two sheets of glass substrates become previously stored values, storing the positions of the marks and calculating and storing an error between positions of the gravitational centers of the two sheets of glass substrates, an inclination between the substrates and a difference between distances between the marks thereof by using a previously stored equation or table; a fifth step of curing the thermosetting resin by heating the substrates using a previously stored value and pressing the substrates using a predetermined pressure; a sixth step of cooling the glass substrates to a predetermined temperature; and a seventh step of measuring and storing the positions of the marks on the two sheets of glass substrates and calculating and storing the error between the positions of the gravitational centers of the two sheets of glass substrates, the inclination between the substrates and the difference between the distances between the marks by using the previously stored equation or table. Another embodiment provides a method of manufacturing a liquid crystal panel wherein a circuit capable of measuring the strain on the glass substrate is formed on the glass substrate. It is preferable that the circuit capable of measuring the strain on the glass substrate be using the same material used to make a TFT element.

A further embodiment provides a method of manufacturing a liquid crystal panel having a structure where the liquid crystal holding area (gap) is surrounded by a thermosetting resin to hold a liquid crystal between two sheets of glass substrates wherein the thermosetting resin is coated on one of the two sheets of glass substrates. The two sheets of glass substrates are overlapped to sandwich the thermosetting resin and the thermosetting resin is cured in a state in which the temperatures of the two sheets of glass substrates differ from each other while glass substrates are pressed together using a predetermined pressure to form a fused element.

DETAILED DESCRIPTION OF THE INVENTION

Figure 1:
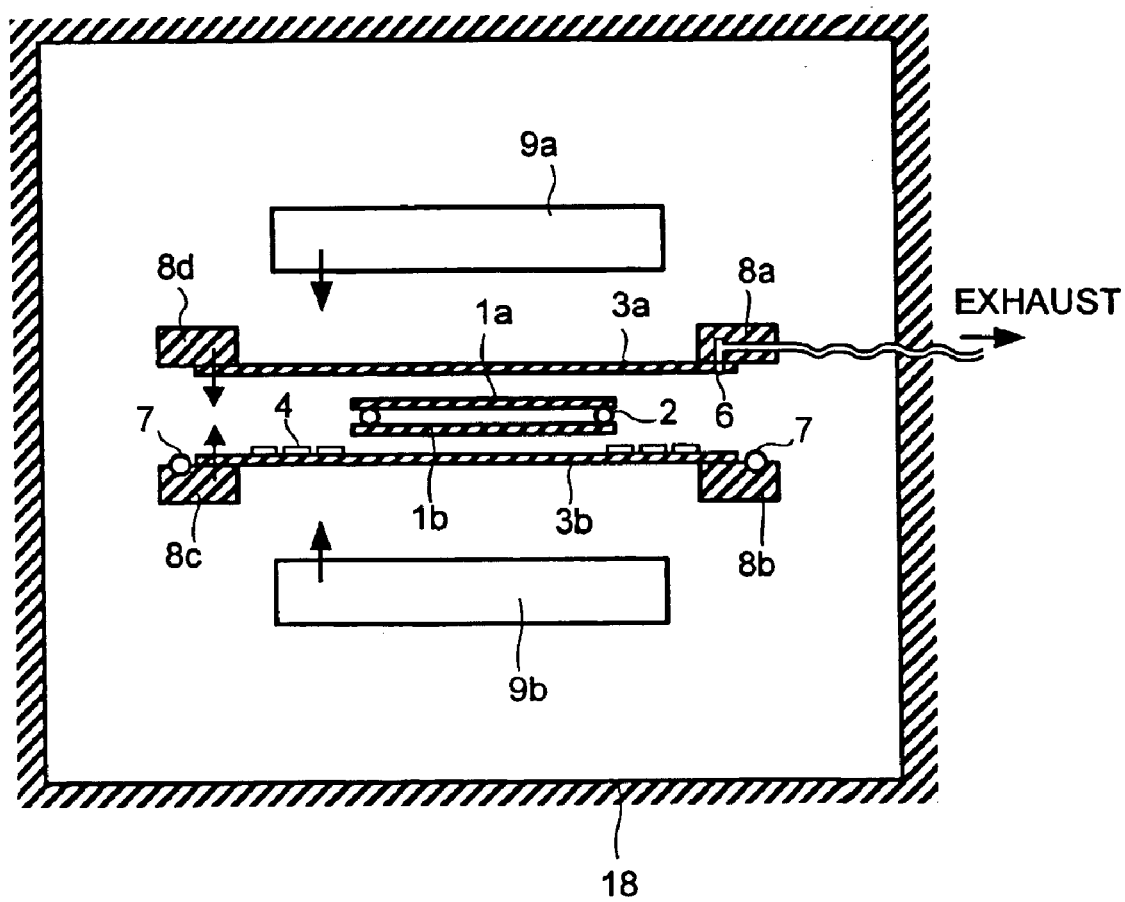
FIG. 1 is a cross-sectional view of a glass substrate processing portion of a liquid crystal panel manufacturing apparatus according to a first embodiment of the present invention.

An explanation of embodiments of the invention in reference to the drawings follows. FIG. 1 shows a pair of glass substrates for holding liquid crystal material 1a and 1b, a thermosetting seal 2 disposed between glass substrates 1a and 1b for surrounding a liquid crystal filling area and sealing liquid crystals in place, flexible heat-resistant sheets 3a and 3b, a projection 4 for ensuring a gap between sheets 3a and 3b at predetermined positions of the sheets in a predetermined range, an exhaust port 6 for exhausting air from a space between sheets 3a and 3b to bring the space between sheets 3a and 3b into a hermetically closed state, an O ring 7 for maintaining the space surrounded by sheets 3a and 3b in the hermetically closed state, sheet holding members 8a, 8b, 8c, and 8d for holding and moving sheets 3a and 3b, heaters 9a and 9b, and chamber 18 surrounding and supporting all of these elements.

Two sheets of glass substrate 1a and 1b sandwiching thermosetting seal member 2, are transferred to a predetermined position inside chamber 18 by a transfer mechanism of a transfer apparatus. Sheet holding members 8a and 8d hold sheet 3a above glass substrate 1a and move the sheet downward, toward the glass substrate; sheet holding members 8b and 8c hold sheet 3b below glass substrate 1b and move the sheet upward toward glass substrate 1b.

Sheets 3a and 3b approach each other to a position at which projection 4 on sheet 3b butts against a surface of sheet 3a. The two sheets 3a and 3b form a space at the butted position and bring that space into a substantially hermetically closed state enveloping thermosetting seal 2 and the glass substrates 1a and 1b within the space. O ring 7 is disposed on sheet holding members 8b and 8c for surrounding the ends of sheets 3a and 3b and maintaining the space created sheets 3a and 3b surrounding the glass substrates in a substantially hermetically closed state. In the substantially hermetical state, air between sheets 3a and 3b is exhausted from exhaust port 6 to evacuate the interior space.

Projections 4 have a height substantially equal to the thickness of the total fused element formed by glass substrates 1a and 1b and are spaced apart from each other by a predetermined gap to form the gap between sheets 3a and 3b on the outer sides of areas of the glass substrates to ensure an air flow path for exhausting air during compression. At decompression, sheets 3a and 3b are brought into close contact with the surfaces of glass substrates 1a and 1b, respectively.

In the decompressed state, glass substrates 1a and 1b are compressed by atmospheric pressure using sheets 3a and 3b. Glass substrates 1a and 1b are pressed to compress the thermosetting seal member 2 to a predetermined gap. In this embodiment, an electrode, a thin film transistor (TFT), a color filter or the like has been formed between glass substrates 1a and 1b, and the predetermined gap can be maintained between the substrates by the spacers.

Sheets 3a and 3b, glass substrates 1a and 1b and thermosetting seal 2 in the pressed state, are heated the top and bottom by heaters 9a and 9b. Heaters 9a and 9b are arranged at positions separated from sheets 3a and 3b, respectively, and heat is transmitted to the sides of sheets 3a and 3b by radiation and convection through the space created by the sheets. The space between the heaters 9a and 9b and respective sheets 3a and 3b can be individually changed and temperatures of the heat sources can be changed by amount of heat employed. ON/OFF power sources also can be provided.

Further, glass substrates 1a and 1b can be heated at different temperatures by a method of fabricating sheets 3a and 3b of materials having different heat conductivities, or by changing the thicknesses of sheets 3a and 3b, or by pasting sheets having different heat conductivities to the surfaces of sheets 3a and 3b on the sides facing the heaters. Further, surfaces of sheets 3a and 3b may be pasted with plastic heat-generating bodies.

The length of the heating period in a heating process can be shortened when heaters 9a and 9b reach the predetermined heat source temperatures too early, before moving to predetermined positions for heating. Heat from sheets 3a and 3b is conducted to glass substrates 1a and 1b and thermosetting seal 2. Thermosetting seal 2 is heated and cured, then compressed between glass substrates 1a and 1b. When heated, thermosetting seal 2 begins softening until the process temperature is reached. The seal is cured at a temperature range higher than the softening temperature range.

Thermosetting seal 2 is brought into close contact with glass substrates 1a and 1b in a softened state. Therefore, when the exhaust processing is carried out, with the seal in the softened state, there is a drawback that the resistance of air flow is increased in the space between the two glass substrates and in the space between sheets 3a and 3b. Thus extra time is required to reach the predetermined decompressed state. Therefore, either or both the heating temperature and the exhaust are controlled such that predetermined decompression is finished (the predetermined decompressed value is reached) when the temperature of thermosetting seal 2 reaches the softening temperature.

When thermosetting seal 2 is cured in the thermosetting temperature region, heating is finished by turning the power sources of heaters 9a and 9b OFF and heaters 9a and 9b are moved back to be remote from sheets 3a and 3b. Further, the exhaust operation is also finished and the space surrounded by the sheets 3a and 3b is released from the decompressed state and returned to atmospheric pressure (atmospheric pressure releasing).

After the atmospheric pressure releasing operation, or at the time of the release of atmospheric pressure, sheet holding members 8a and 8d are moved upward and sheet holding members 8b and 8c are moved downward to separate sheet 3a from glass substrate 1a and sheet 3b from glass substrate 1b. Next, the fused element of glass substrates 1a and 1b sandwiching thermosetting seal 2, is transferred from inside of chamber 18 by the transfer mechanism of the transfer apparatus.

Figure 3:
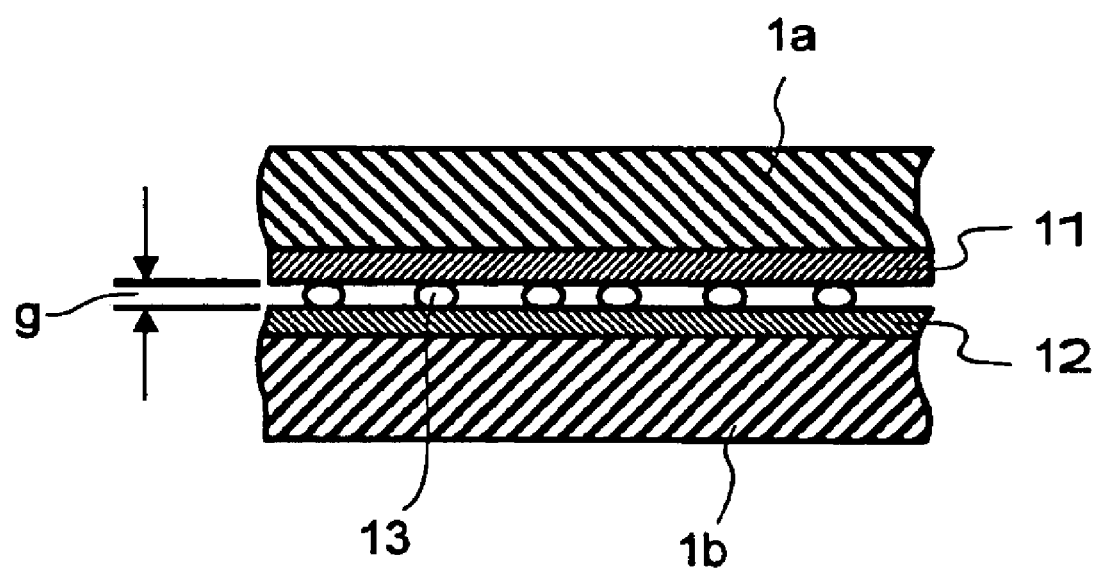
FIG. 3 is a view showing a section of a liquid crystal panel manufactured by a method of the invention in which a thermosetting seal is not provided.

FIG. 3 shows a cross section of a panel finished in this way and shows a thin film transistor/transparent electrode 11, a color filter 12, a spacer 13 and a gap g. Liquid crystals filling takes place at the gap g. The liquid crystals fill the gap created between the glass substrates 1a and 1b and kept from leaking out by the seal (not shown) formed by the thermosetting resin thermally cured by the processing.

Figure 2:
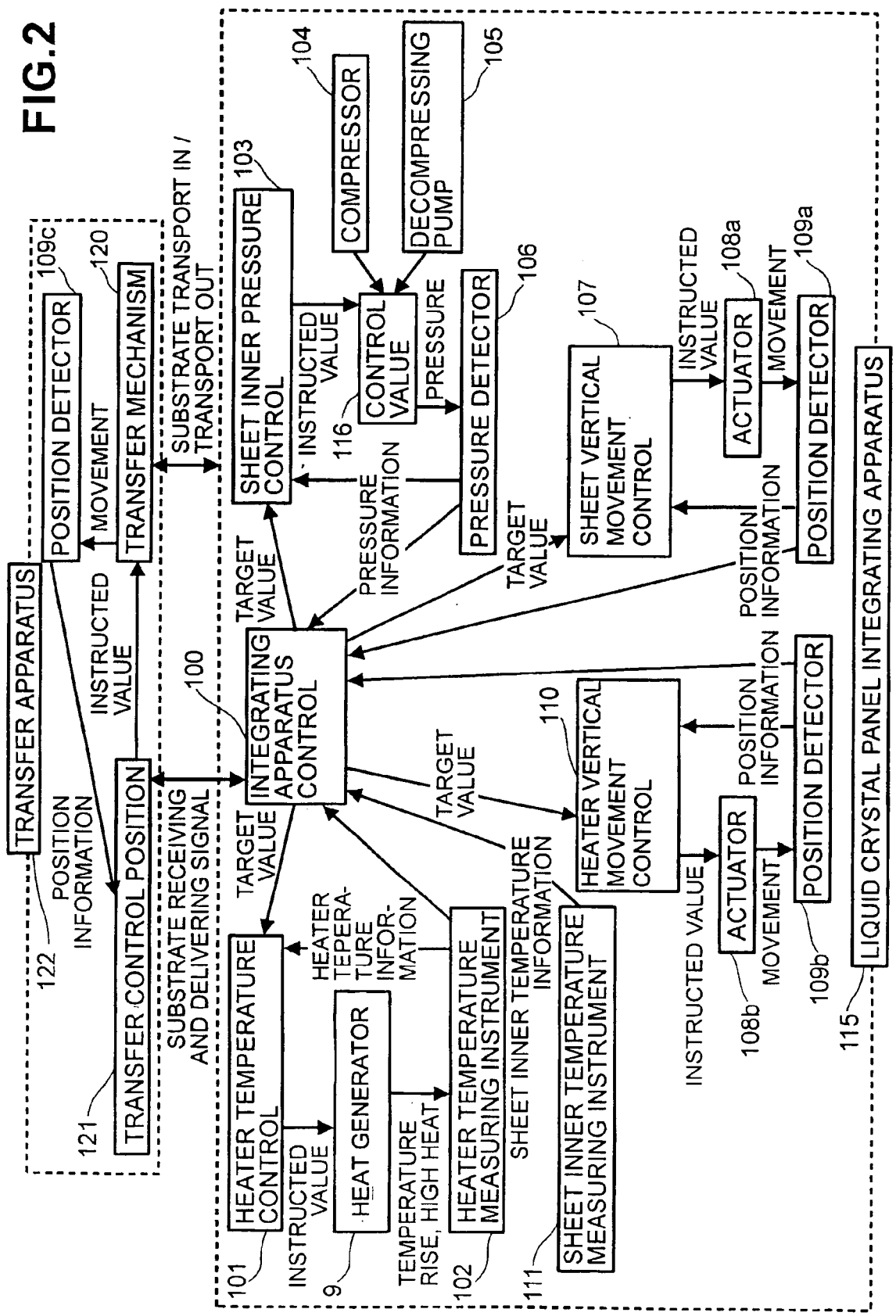
FIG. 2 shows a block of a control system for a liquid crystal panel manufacturing apparatus, showing an exemplary configuration for controlling the glass substrate process of FIG. 1.

In FIG. 2, shows a transfer apparatus 122 for transferring glass substrates 1a and 1b sandwiching thermosetting seal 2 the work piece into chamber 18, positioning the work at a predetermined position and transferring the work piece (now the fused element) from inside the chamber 18 outside the chamber 18 at the completion of curing thermosetting seal 2, a transfer mechanism inside of the transfer apparatus 122, which is a mechanism for transferring in, positioning and transferring out the fused element; a position detector 109c for detecting the position and attitude of the work piece and the position of the transfer mechanism 120; and a transfer control 121 for controlling operation of transfer mechanism 120 based on a detecting signal (position information) of the position detector 109c.

FIG. 2 further shows a liquid crystal panel integrating apparatus 115 coupled to transfer apparatus 122; an integrating apparatus control 100 for controlling transferring apparatus 122 and liquid crystal panel integrating apparatus 100; a position detector 109a for detecting positions of sheet holding members 8a through 8d or sheets 3a and 3b in FIG. 1; an actuator 108a for moving the sheet holding members 8a through 8d; a sheet vertical movement control 108a for controlling actuator 108a based on a detecting signal of position detector 109a and information from integrating apparatus control 100; a pressure detector 106 for detecting pressure of the space surrounded by sheets 3a and 3b a control valve 116 for controlling pressure of the space surrounded by sheets 3a and 3b; a sheet inner pressure control 103 for controlling control valve 116 based on a detecting signal of pressure detector 106 and information from integrating apparatus control 100; a compressor 104 for supplying air to the space between sheets 3a and 3b via control valve 116 positively in releasing to the atmospheric pressure explained in reference to FIG. 1; a decompressing pump 105 for bringing the space into the decompressed state by exhausting the space surrounded by sheets 3a and 3b; a heat generating 9 of heaters 9a and 9b; a heater temperature measuring instrument 102 for measuring the temperature of the heat generating and outputting heater temperature information; a sheet inner temperature measuring instrument 111 for measuring the temperature of the space surrounded by sheets 3a and 3b and outputting heater temperature information; a heater temperature control 101 for controlling heat generating portion 9 of the heaters 9a and 9b based on temperature information from heater temperature measuring instrument 102, the sheet inner temperature measuring instrument 111 and control information from integrating apparatus control 100; a position detector 109b for detecting positions of heaters 9a and 9b; an actuator for moving heaters 9a and 9b; heater vertical movement control 110 for controlling actuator 108b based on a detecting signal of position detector 109b and information from integrating apparatus control 100. Position detector 109a actuator 108a and sheet vertical movement control 107, constitute a moving control system of sheets 3a and 3b at inside of liquid crystal panel integrating apparatus 115; pressure detector 106, control valve 116, sheet inner pressure control 103, compressor 104 and decompressing pump 105 constitute a pressure control system of the space surrounded by sheets 3a and 3b; heat generating portion 9, heater temperature measuring instrument 102, sheet inner temperature measuring instrument 111, heater temperature control 101 position detector 109b, actuator 108b and heater vertical movement control 110, constitute a heating control system.

A control signal (substrate receiving and delivering signal) is transmitted and received between the integrating apparatus control 100 of liquid crystal panel integrating apparatus 115 and transfer control 121 of transfer apparatus 122. In this embodiment, the work piece as the fused element sandwiching the thermosetting seal 2 between glass substrates 1a and 1b, is transferred into chamber 18 of liquid crystal panel integrating apparatus 115 and placed at a predetermined position by transfer mechanism 120 of transfer apparatus 122.

After positioning the work, sheet holding members 8a through 8d are moved by actuator 108a controlled by sheet vertical movement control 107. Sheet 3a is moved downward from above the work; sheet 3b is moved upward from below the work. The respective sheets are stopped at the predetermined positions, and the space between sheets 3a and 3b is brought into a substantially hermetically closed state, the work enveloped therein.

In the enveloped state, decompressing pump 105 in the pressure control system, exhausts the space between sheets 3a and 3b and the of that space is brought to a predetermined decompressed state relative to the atmospheric pressure. The pressure level of the space is controlled by control valve 116 of pressure control 103 based on pressure information from pressure detector 106. The exhausting operation by decompressing pump 105 continues even after the space reaches the predetermined decompressed state to thereby maintain the predetermined decompressed state or to remove moisture in the space portion. In this embodiment, the work piece is heated via sheets 3a and 3b by controlling the positions of either or both heaters 9a and 9b and the temperature of heat generating portion 9.

The heater position is controlled by controlling actuator 108b by the heater control 110 based on position information from position detector 109b. When the temperatures of heaters 9a and 9b are constant, the nearer the positions of heaters 9a and 9b to the work piece, the higher the heating temperatures of the work piece. Further, the temperature of heat generating portion 9 is controlled by controlling heat generating portion 109 through heater temperature control 101 based on temperature information from sheet inner temperature measuring instrument 111 and temperature information from heater temperature measuring instrument 102.

The operation of heating the work piece may be started after bringing the space between sheets 3a and 3b into the predetermined decompressed state or may be started before the predetermined decompressed state is created. When the operation is started before bringing about the predetermined decompressed state, particularly in view of the exhaust function, the heating temperature and the temporal elevating rate thereof are controlled by heater temperature control 101, with the heater vertical control such that thermosetting seal 2 between the glass substrates starts softening after the predetermined decompressed state is brought about.

After thermosetting seal r 2 is thermally cured into a predetermined state, heaters 9a and 9b are turned OFF and heaters 9a and 9b are moved, repositioning them at the upper side of sheet 3a and the lower side of the sheet 3b, respectively. The exhaust operation by of decompressing pump 105 is also turned OFF and air is supplied to the space between sheets 3a and 3b by compressor 104 to return the space to atmospheric pressure. Further, sheet holding members 8a through 8d are moved by the vertical sheet moving control portion 107 of actuator 108a to move sheet 3a to the upper side of the work and sheet 3b to the lower side of the work, and sheets 3a and 3b are separated from the glass substrates of the work and moved to predetermined positions, respectively.

Thereafter, the processing completed, the fused element is transferred out of chamber 18 by transfer mechanism 120. The integrating apparatus control 100 controls transfer control 121, sheet vertical movement control 107, sheet inner pressure control 103, heater temperature control 101 and the heater vertical movement control 110. The operation of transferring in and positioning the work piece, the operation of moving the sheets, the operation of exhausting and decompressing, the operation of moving and heating the heaters and finishing the heating, the operation of moving the heaters back, the completion of the exhaust operation, atmospheric pressure releasing, the removal of the sheets and the operation of transferring out the fused element, are carried out as a series of processing steps.

Figure 4:
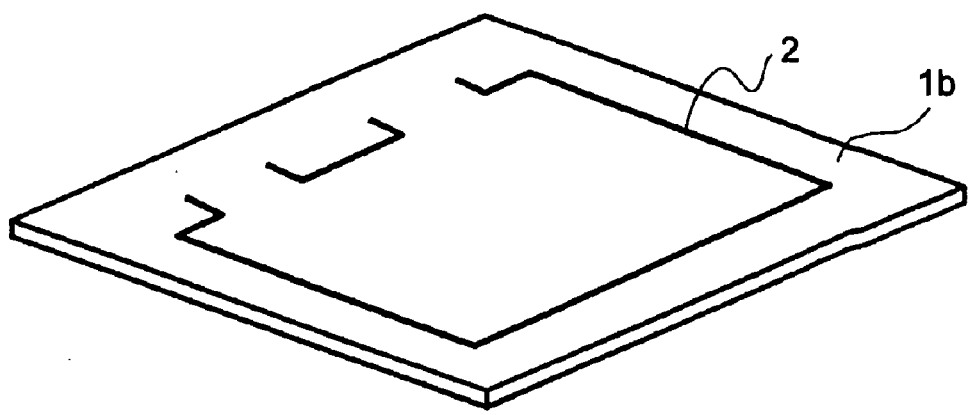
FIGS. 4A, 4B and 4C are views showing the thermosetting seal subjected to heating processing by a technology of the invention.
Figure 4:
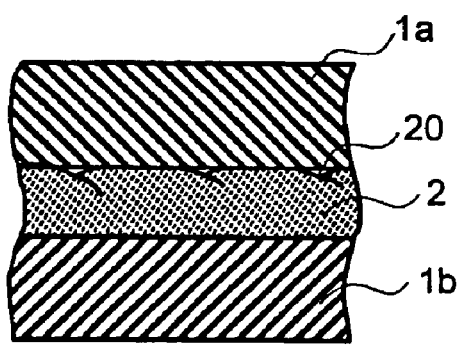
Figure 4:
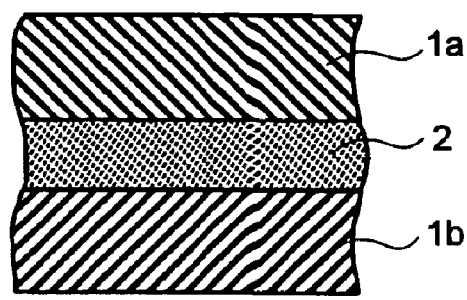

FIGS. 4a, 4b and 4c show states of the thermosetting seal 2 for heat-processing by the technique of the invention, FIG. 4a is a perspective view of the state of the thermosetting seal 2 on the glass substrate 1b when a coating is applied. FIG. 4b is a sectional view of the state of thermosetting seal 2 by when it is sandwiched between the two sheets of the glass substrates before the seal is softened, and FIG. 4c is a sectional view of a state of sandwiching thermosetting seal 2 between glass substrates 1a and 1b when the seal is softened by heating.

In FIG. 4a, a portion at which the linear thermosetting seal 2 is interrupted indicates the port for filling by liquid crystals. Before the seal is softened, as shown in FIG. 4b, there is a small gap 20 between the thermosetting seal 2 and a surface of glass substrate 1a. By using a decompressing pump, air is exhausted outside of the sheet that will envelop the work piece with gap 20 serving as the exhaust channel. Further, when the heating temperature is elevated higher than the temperature in the softened state of FIG. 4C, the seal 2 is thermally cured in a state similar to that shown in FIG. 4C.

Figure 5:
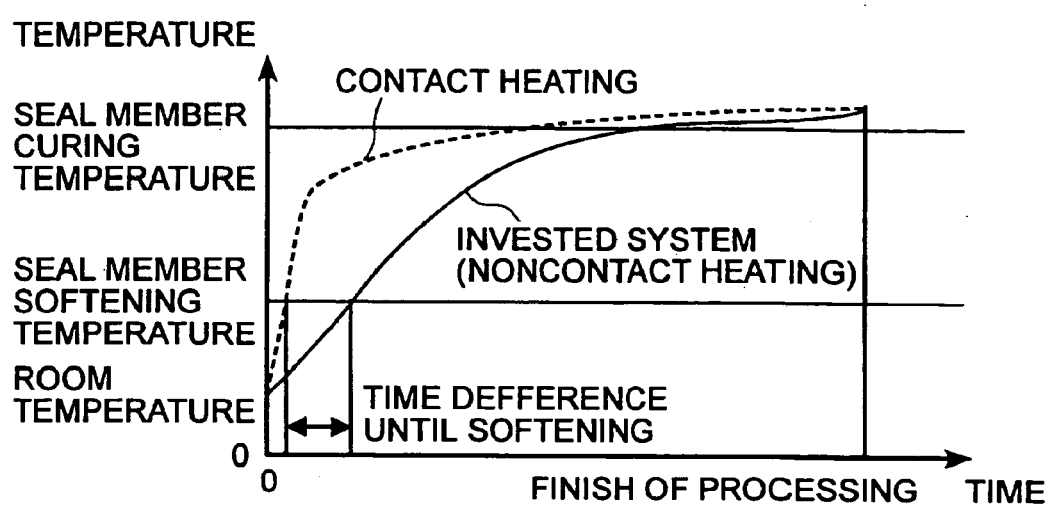
FIG. 5 is a diagram showing an example of a temperature rise characteristic of the thermosetting seal according to the technology of the invention.

FIG. 5 is a diagram showing an example of a temperature rise characteristic of the thermosetting seal according to the technology of the invention. The abscissa designates heating time and the ordinate designates temperature of the seal member. For example, according to the embodiment of the FIG. 1 of the invention, there is a configuration in which heaters 9a and 9b are positioned to be separated from sheets 3a and 3b, glass substrates 1a and 1b and thermosetting seal 2, and heat is conducted to the sides of sheets 3a and 3b by radiation and convection through the space formed by enclosure in the sheets, and therefore, in comparison with a system of bringing a heater into direct contact with the work piece, the temperature rise of the thermosetting seal by indirect heating is gradual and the time period for reaching the softening temperature of the seal is long. Heat is uniformly transmitted to the glass substrates 1a and 1b and the thermosetting seal 2 and temperature gradients of the glass and seal resin are also moderated.

Because the time needed to reach the softening temperature is long, the process of decompressing the space between the sheets 3a and 3b can be carried out before softening the seal, and because heat is uniformly transmitted, glass substrates 1a and 1b are kept from being deformed such as warping or shifting away from each other, and the nonuniformity of partially curing or partially curing seal 2 can be prevented.

Figure 6:
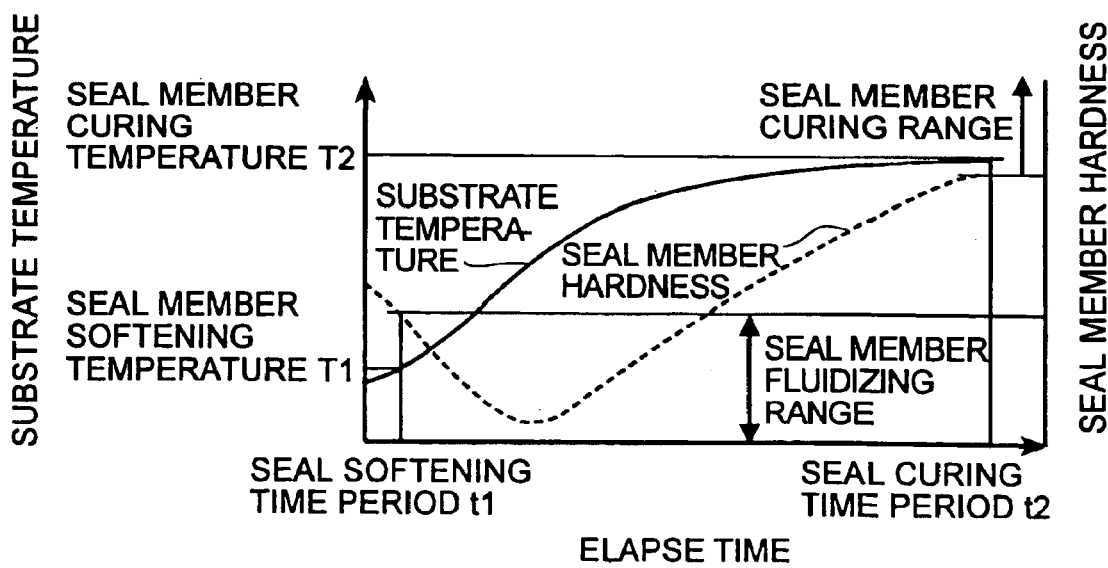
FIG. 6 is a diagram showing an example of a temperature increase characteristic of a glass substrate and an example of curing characteristic of the thermosetting seal according to the technology of the invention.

FIG. 6 shows an example of the temperature rise characteristics of glass substrates 1a and 1b and an example of a curing characteristic of thermosetting seal member 2 according to the technology of the invention. Glass substrates 1a and 1b have heat conducted to them by radiation or convection from the heaters through the space created by the enveloping sheets 3a and 3b, and heat is conducted to thermosetting seal 2 sandwiched therebetween. The substrate temperature is elevated until the thermosetting seal 2 reaches a temperature (seal curing temperature) T2 that thermally cures the thermosetting resin and the time is counted down (seal curing time period t2). Meanwhile, the hardness of thermosetting seal 2 is temporarily reduced to reach a fluidizing state as temperature of the seal, itself, increases.

When the temperature reaches the seal softening temperature T1, (elapsed time period t1 (seal softening period)), thermosetting seal 2 is softened toward be a fluidizing state and the hardness continues to be reduced with the resin reaching a certain temperature. However, when the temperature is elevated, the hardness starts increasing and when the temperature exceeds the softening temperature T1, thermosetting seal 2 loses fluidity and is gradually brought into a solidified state.

Figure 7:
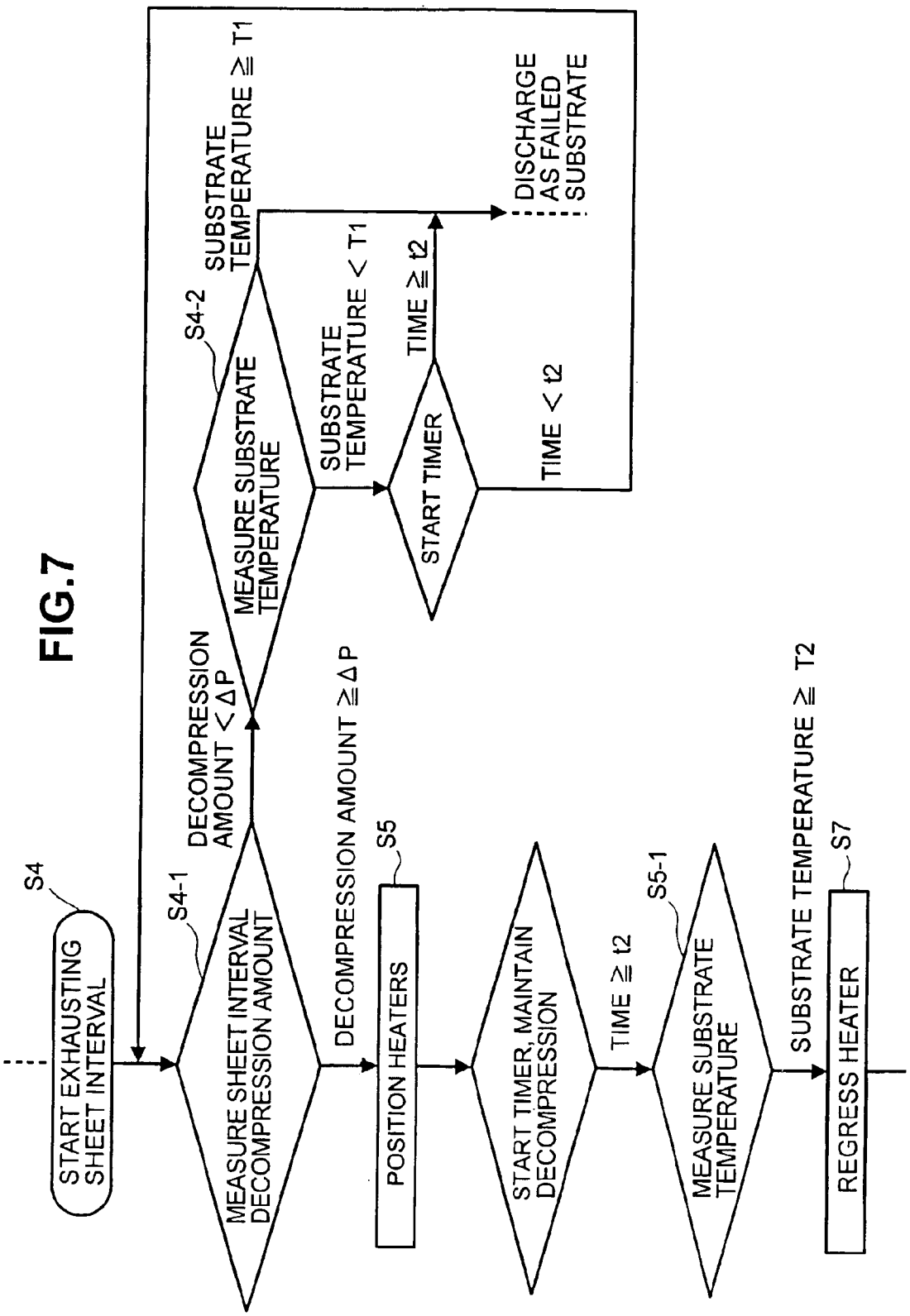
FIG. 7 is a flow chart showing a procedure for exhausting, decompressing and heating a work piece according to the technology of the invention.

In FIG. 7, the space between the sheets is exhausted (S4), a decompression amount for the space is measured (S4-1) and when the decompression amount is equal to or larger than a predetermined value ΔP, the heaters are positioned (S5) to be brought into a heating state. In the heating step, heating is carried out over a period equal to or longer than the seal curing period t2. Decompression of the space between the sheets is confirmed; the temperature of the glass substrate is measured (S5-1), and when the temperature is equal to or higher than the curing temperature T2, the heaters are moved back (S7). Further, in a case where heating has been started in the exhausting operation, when the decompression amount for the space between the sheets is measured (S4-1), if the decompression amount does not reach the predetermined value ΔP, the temperature of the glass substrate is measured (S4-2); only when the temperature does not reach the seal softening temperature T1, the space portion between the sheets is exhausted again. In a case where the temperature has already reached the seal softening temperature t1, the glass substrate is discharged as a failed substrate.

Figure 8:
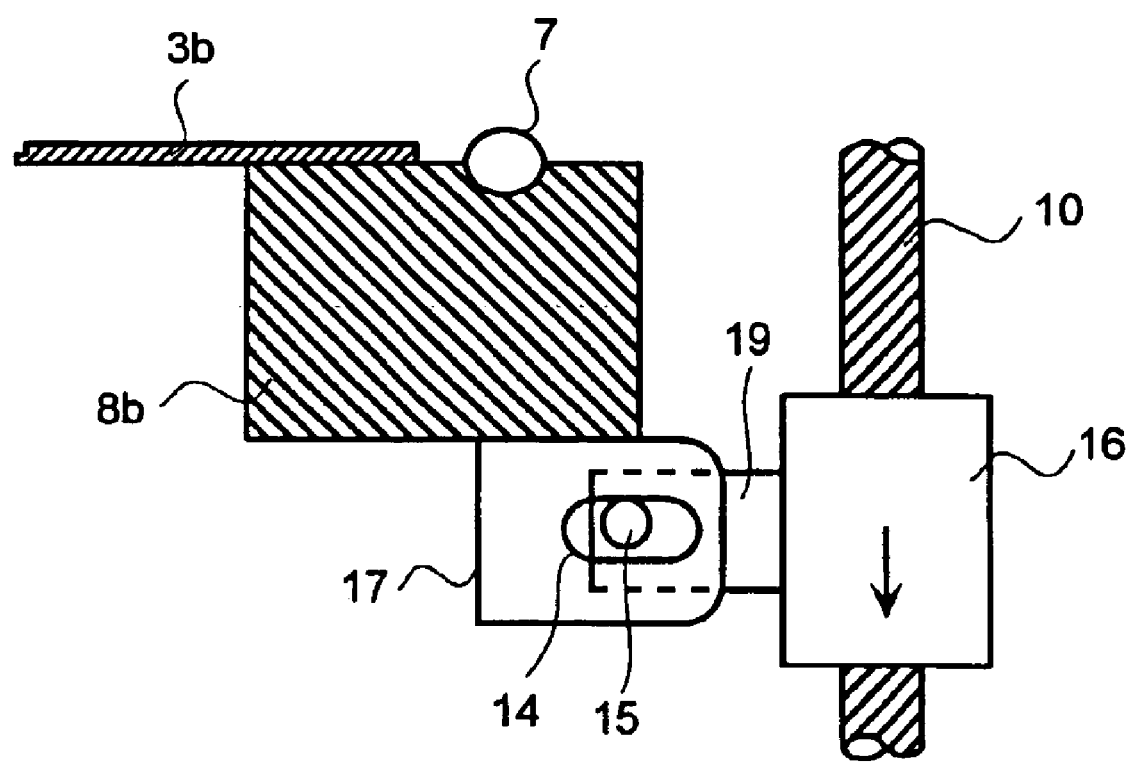
FIG. 8 shows an example of the structure of an actuator for moving a sheet holding member.

FIG. 8 is a view showing a configuration of the actuator for holding member 8b which is one of the sheet holding members 8a through 8d. The same configuration applies to the actuator for all the holding members. FIG. 8 shows a part 17 fixed to seal holding member 8b; a hole 14 in part 17; a pin 15 engaged with hole 14 with a clearance, particularly, a sufficient clearance in the left and right direction of the drawing; a part 19 provided with pin 15; a cylindrical support 16 for supporting part 19 and a rod 10 having a screw at a surface thereof for moving cylindrical support unit 16 by rotation.

When the heating processing of the work piece, now a fused element sandwiching the thermosetting seal between the glass substrates, has been finished, the heater is moved back and thereafter, sheets 3a and 3b are separated from the fused element, rod-like part 10 is rotated to move cylindrical support unit 16 downward, thereby moving sheet holding member 8b downward.

At this time, at the opposite end of sheet 3b, the rod does not rotate and cylindrical support unit 16 does not start moving downward. Therefore, the sheet 3b starts separating from the fused element from the portion on the side of sheet holding member 8b. When sheet holding member 8b moved down to a predetermined position, rotation of rod-10 stops to stop the movement of sheet holding member 8b. Next, the rod on the side of the sheet holding member 8c is rotated to move the support unit and sheet holding member 8c down and the portion of sheet 3b on the side of sheet holding member 8c is separated from the fused element.

When sheet holding member 8c is moved down to a position substantially the same as that of sheet holding member 8b, rod 10 on the side of sheet holding member 8b is rotated again to start moving sheet holding member 8b down, and sheet holding member 8b and e sheet holding member 8c are moved in parallel to predetermined positions. The same procedures are followed for sheet holding members 8a and 8d for holding sheet 3a. According to this configuration, separation of the sheet from the fused element is facilitated.

Figure 9:
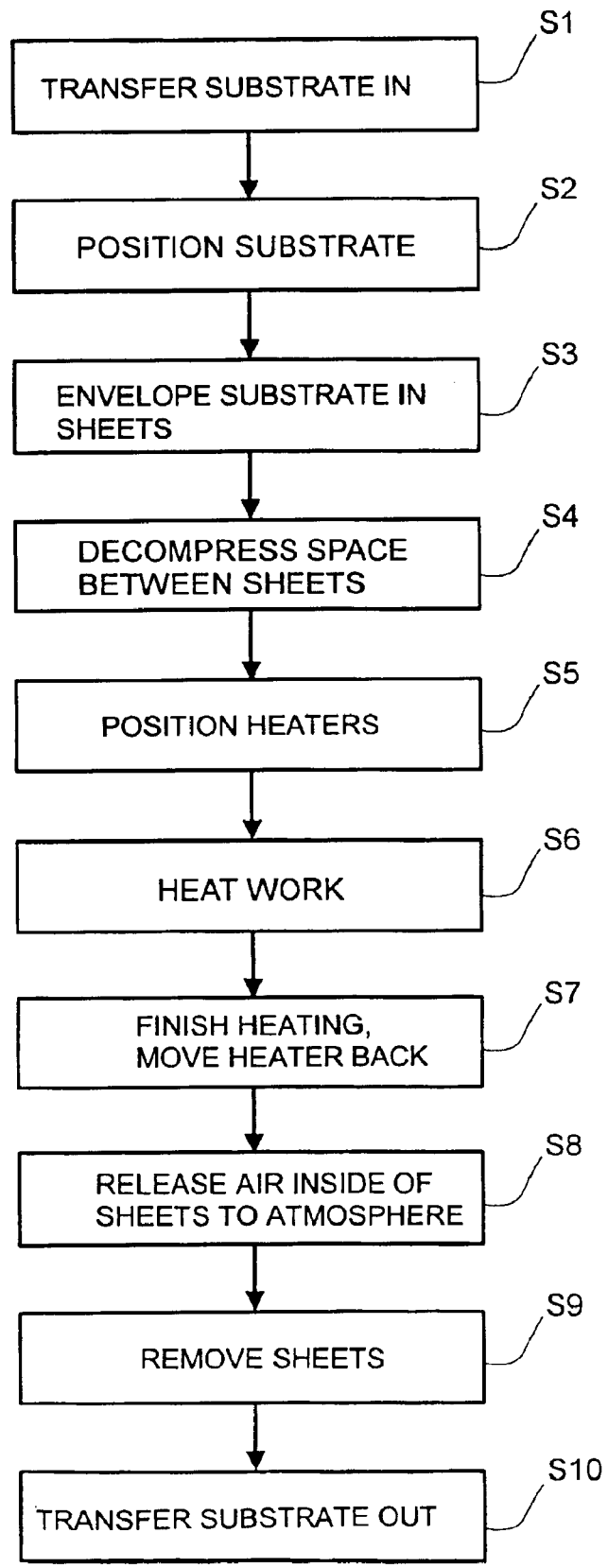
FIG. 9 is a process flow chart for transferring a substrate in and out of the chamber.

FIG. 9 shows an example of a processing procedure for transferring in the substrates as the work piece to transferring out the substrates as a fused element. The processing at step S1 transfers the work piece with the thermosetting seal inserted between the glass substrates into a chamber using the transfer mechanism of the invention. Step S2 positions the substrate at the predetermined position, followed by step S3 of enveloping the work in a substantially hermetically closed state by enveloping the work in heat-resistant sheets. At step S4 pressure is applied on the work piece by the atmospheric pressure, exhausting the hermetically closed space created by enclosure in the sheets to a decompressed state relative to the atmospheric pressure. Then, at step S5 heaters are brought into position on both sides of the work, and the sheets are heated from predetermined distances through the space created by enclosure in the sheets at step S6, the heat being conducted to the work piece in the sheets to cure the thermosetting seal member between the glass substrates of the work. At step S7 heating is completed by turning the heaters OFF after curing the thermosetting seal member and withdrawing the heaters from the both sides of the work. Step S8 involves releasing the space surrounded by the sheets from the decompressed state to return to the atmospheric pressure state (atmospheric pressure releasing). At step S9 the sheets are separated and removed from the completed work piece, the fused element, by moving the sheet holding members, and at step S10 the fused element, in which the thermosetting seal member between the glass substrates has been cured, is transferred from the chamber by the transfer mechanism. Through this processing, the fused element of glass substrates for holding liquid crystals having a predetermined gap is formed.

The heating operation at step S6 may be started after bringing the pressure at the space between the sheets into the predetermined decompressed state of step S4 or may be started before the predetermined decompressed state is brought about. According to the manufacturing method of the present invention, the space between the sheets can be exhausted safely and efficiently, the seal member can be processed in a short time and productivity of the liquid crystal panel can be improved. The glass substrate and the seal member can be uniformly heated by moderating the influence of dispersion in the temperature of the heater, and a uniformly pressed and high-quality formation of the liquid crystal panel is achieved by making the gap between the substrates consistent and preventing the glass substrate from being shifted or warped. Further, the hardness characteristic of the seal is easy to control. In addition, even when the substrate area is increased, large-sized formation of the apparatus can be controlled. The sheet can easily be separated from the glass substrate.

Figure 10:
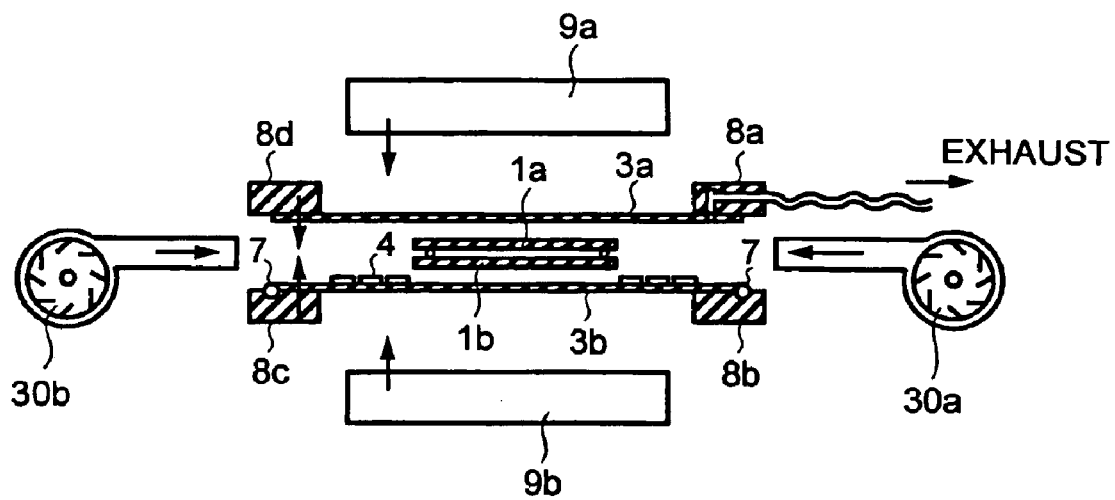
FIG. 10 is a cross-sectional view of a glass substrate processing portion of a liquid crystal panel manufacturing apparatus.

FIG. 10 shows a second embodiment of a liquid crystal panel manufacturing apparatus. The embodiment is an example of a configuration providing a blower as cooling means for cooling the sheets. The chamber 18 of the first embodiment is not shown, but other parallel elements have the same reference numbers. In FIG. 10, blowers 30 and 30b blowing cool air into the space between the sheets. The cool air is blown in a state in which sheets 3a and 3b are separated from the glass substrates 1a and 1b, respectively. Control of the timing of blowers and the amount of blown air can be carried out for the respective blowers. The configuration and operation of other parts are substantially the same as those of the embodiment of FIG. 1.

According to the configuration of this embodiment, sheets 3a and 3b can forcibly be cooled and the temperature of the sheet which is brought into close contact with the glass substrate can be lowered in decompressing the space between the sheets. When the temperature of a sheet is excessively high, there is a risk that the seal between the glass substrates will soften before the space is brought into the predetermined decompressed state, and the decompressing operation from a normal state becomes difficult; however, according to the configuration of the embodiment, the risk can definitely be prevented. Other operations and effects are similar to those of the embodiment of FIG. 1.

Figure 11:
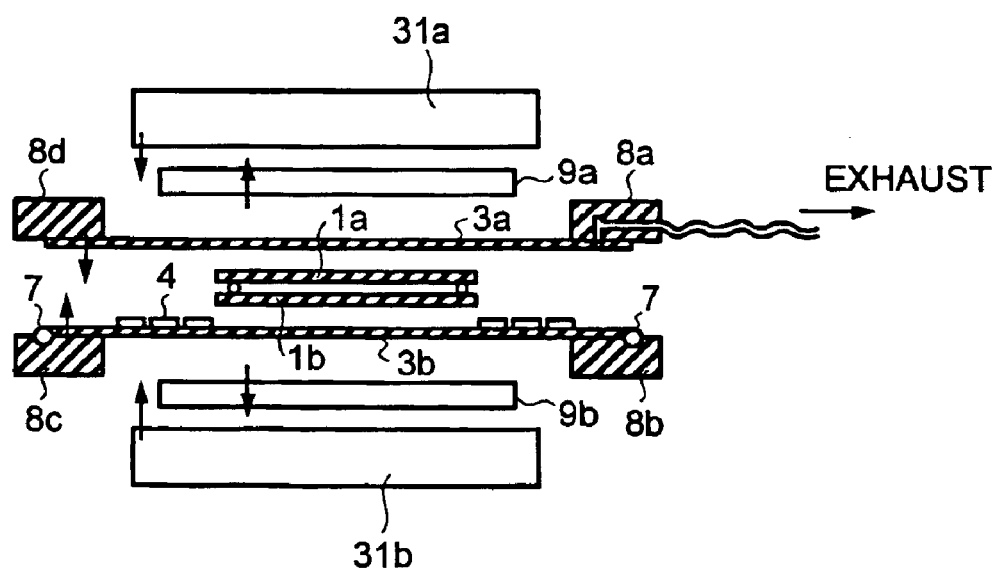
FIG. 11 is a cross-sectional view of a glass substrate processing portion of a liquid crystal panel manufacturing apparatus.

FIG. 11 shows a third embodiment of a liquid crystal panel manufacturing apparatus of the invention. The embodiment is an example of a configuration providing cooling means on both upper and lower sides of the heaters. FIG. 11 like FIG. 10, omits illustration of chamber 18. In FIG. 11, cooling means 31a and 31b cool the heaters 9a and 9b, respectively by being positioned proximate to them or brought into contact with them.

After the heat processing, heaters 9a and 9b are turned OFF and are cooled by being moved proximate to or brought into contact with the cooling means. When cooling means 31a and 31b are moved to be proximate to or brought into contact with heaters 9a and 9b, sheets 3a and 3b can also be cooled by cooling means 31a and 31b. The cooling means may be a type of metal plate, a way of using water or other method. Configuration and operation of other elements are substantially similar to those of the embodiment of FIG. 2.

According to the configuration of this embodiment, heaters 9a and 9b can forcibly be cooled, the fused element, finished with heat processing, can be transferred from inside the chamber in a state where the temperature has been lowered and, with respect, to a work piece newly transferred into the chamber for heat processing, early softening of the seal between the glass substrates can be prevented.

The transfer mechanism for transferring out and transferring in of workpieces can be operated in an environment of the lowered temperature. Other operations and effects are similar to those the embodiment of FIG. 1. Further, there may be constructed a configuration having both the cooling means for cooling the sheets according to the previous embodiment and the cooling means for cooling the heaters according to this embodiment. Further, the heating means (heater) applied to the invention is not limited to the configurations of this embodiment but, for example, may be a construction using hot air jets or the like.

Figure 12:
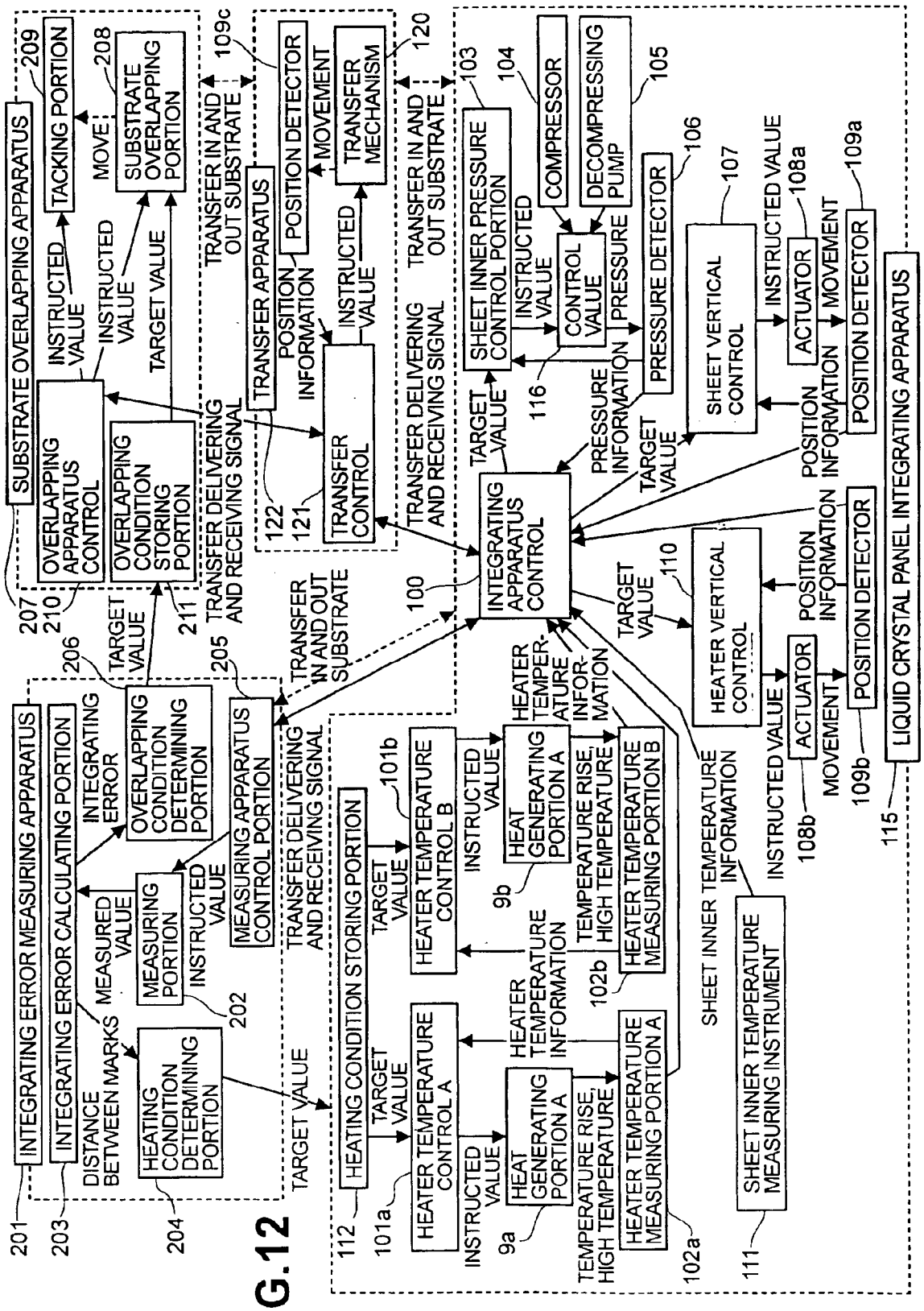
FIG. 12 shows a block diagram a control system of a liquid crystal panel manufacturing apparatus.

FIG. 12 is a view showing another embodiment of the invention, as block diagram of a total of a control system of a liquid crystal panel manufacturing apparatus mounted with an integrating error measuring apparatus and a substrate overlapping apparatus. The elements shown include integrating error measuring apparatus 201 for measuring integrating accuracy of a liquid crystal panel integrated by the liquid crystal panel integrating apparatus 115; a measuring portion 202 for measuring a relative positional error of an alignment mark; an integrating error calculating portion 203 for calculating an integrating error of the liquid crystal panel from the relative positional error of a plurality of the alignment marks; a heating condition determining portion 204 for determining the heating condition from the integrating error of the liquid crystal panel; a measuring apparatus control portion 205 for controlling these; and an overlapping condition determining portion 206.

The substrate overlapping apparatus 207 for overlapping two sheets of glass substrates while positioning the glass substrates; a substrate overlapping portion 208; a tacking portion 209; an overlapping apparatus control portion 210; and an overlapping condition storing portion 211 are also shown. The liquid crystal panel is composed of two sheets of glass substrates 1a and 1b and alignment marks for positioning are provided on the respective glass substrates. The alignment mark is formed simultaneously with the thin film transistor/transparent electrode 11 or the color filter 12 and when the marks overlap, the overlapping signifies that the integrating error of the liquid crystal panel is null.

The glass substrates are overlapped in substrate overlapping apparatus 207, positioning them by using the alignment marks at substrate overlapping portion 208. At this time, by positioning the substrates to achieve a target value acquired from overlapping condition storing portion 211, the final integrating error is minimized. After the glass substrates are tacked by tacking portion 209, the substrates are transferred to the liquid crystal panel integrating apparatus 115. At the liquid crystal panel integrating apparatus 115, a heating condition storing portion 112 stores the heating condition.

When the liquid crystal panel is integrated, integrating apparatus control portion 100 reads the heating condition from heating condition storing portion 112 and provides target values to heater temperature control portions 101a and 101b, respectively. By using the respective target values, temperatures and distances to the glass substrate of heaters 9a and 9b are separately controlled. Configuration and operation of other portions are substantially similar to those of the embodiment of FIG. 1. After integrating the liquid crystal panel, panel is transferred into integrating error measuring apparatus 201.

At integrating error measuring apparatus 201, the relative positional error of the alignment mark is measured by measuring portion 202. Normally, a plurality of sets of alignment marks is measured, and at integrating error measuring portion 203, the relative integrating error of the total of the liquid crystal panel and distances between marks are calculated by using the least squares method from the relative positional errors of the alignment marks. At the heating condition determining portion 204, the heating condition is determined from the integrated distance between marks and saves the heating condition at heating condition storing portion 112. At the overlapping condition determining portion 206, an overlapping condition is determined from the relative integrating error of the total of the liquid crystal display panel and saved in overlapping condition storing portion 211.

FIGS. 13a, 13b and 13c show an integrated state of a liquid crystal panel. FIG. 13a is a perspective view of an integrated liquid crystal panel. FIG. 13b is a sectional view of a state in which glass substrates 1a and 1b are heated at equal temperature, and FIG. 13c is a sectional view of a state in which the heating temperature of glass substrate 1b is higher than the heating temperature of glass substrate 1a. In integrating the liquid crystal panel, as shown by FIG. 13a, the two sheets of glass substrates are overlapped such that alignment marks 220a and 220b on glass substrate 1a and alignment marks 220c and 220d on glass substrate 1b overlap each other.

In FIG. 13b, La denotes the distance between alignment marks 220a and 220b and Lb denotes the distance between the alignment marks 220c and 220d. In integrating the liquid crystal panel, there is a heating step for curing the seal 2 and, for example, since films are formed having different properties such as the thin film transistor or the transparent electrode on the surface of glass substrate 1a and the color filter on the surface of glass substrate 1b, the thermal expansion coefficients of the respective substrates differ from each other and when glass substrates 1a and 1b are heated at equal temperature, values of the distances between the marks La and Lb differ from each other. For example, when the distance between marks La is larger than the distance between marks Lb, as shown in FIG. 13b, and the substrates are heated at an equal temperature, the error can be resolved by making the heating temperature of glass substrate 1b higher than that of glass substrate 1a. Glass substrate 1b can be expanded more than glass substrate 1a, and as shown in FIG. 13c, the difference between the distances between marks La and Lb can be formulated to be "0". Although the embodiment, provides an example of two pairs of alignment marks, the error of the distance between marks can also be calculated using more alignment marks.

Figure 13:
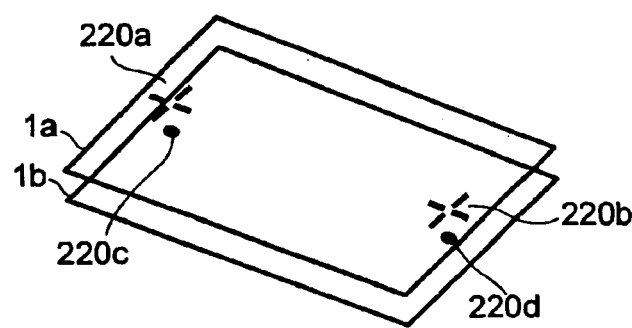
FIGS. 13a, 13b and 13c are views for explaining an effect of temperature difference heating.
Figure 13:
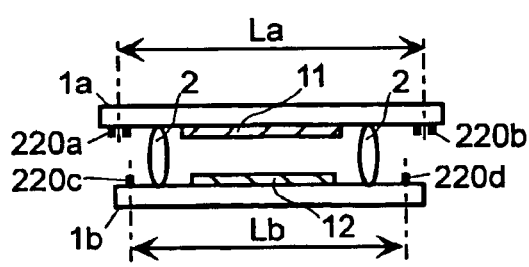
Figure 13:
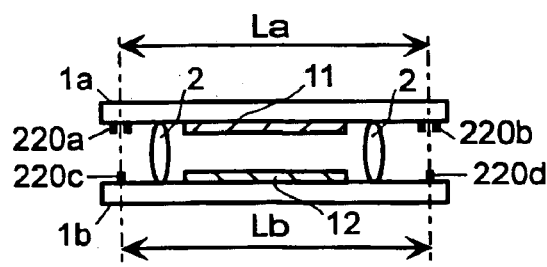
Figure 14:
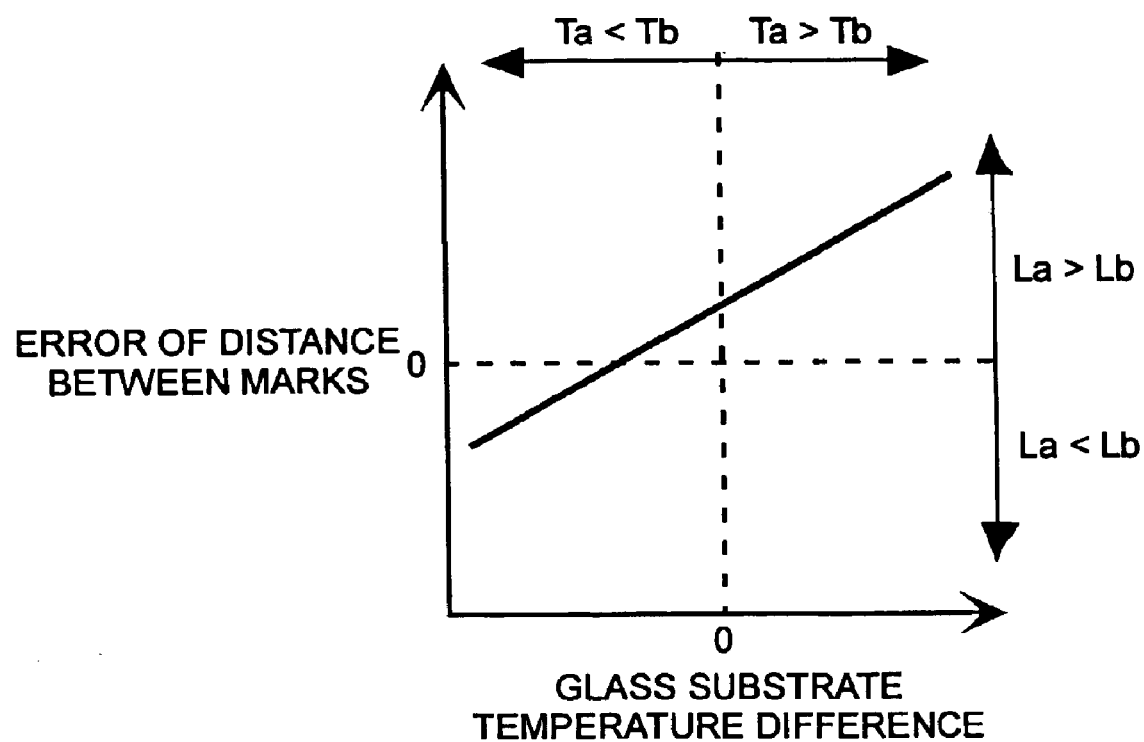
FIG. 14 is a diagram for explaining the function of an error in a distance between marks in the temperature difference heating.

FIG. 14 shows an example of a change in the error of the distance between marks owing to a difference between the heating temperatures of glass substrates 1a and 1b. The abscissa designates the difference between the heating temperatures applied to glass substrates 1a and 1b and the ordinate designates the error of the distance between marks. Here, the heating temperature difference is defined as a value subtracting temperature of glass substrate 1b from the temperature of glass substrate 1a and takes a positive value when the temperature of glass substrate 1a is higher than the temperature of glass substrate 1b. The error of the distance between marks is defined as a value subtracting the distance between marks Lb of glass substrate 1b from the distance between marks La of glass substrate 1a and takes a positive value when the distance between marks La is larger than the distance between marks Lb. According to the example of FIG. 14, in the case of heating the glass substrates at equal temperature, that is, when the difference between the heating temperatures is "0", the error of the distance between marks is positive, the distance between marks La is larger than the distance between marks Lb showing the state of FIG. 13a.

In FIG. 14, when the heating temperature of glass substrate 1b is elevated, that is, when the heating temperature difference is negative, the error of the distance between marks becomes "0". The heating temperature difference Tc at this occasion may be given as a target value. For example, when the curing temperature of thermosetting resin 2 is 120 degrees and the heating temperature difference is adjusted by 20 degrees, the heating temperature Ta of glass substrate 1a may be adjusted to 120 degrees and the heating temperature Tb of the glass substrate 1b may be adjusted to 140 degrees. Further, the heating temperature at this time may be stored in the heating condition determining portion 204.

There is a case in which the error of the distance between marks does not formulate to "0," even when the value stored in heating condition determining portion 204 is used as the heating temperature for a variation of the process or a difference of apparatus in the step of forming the thin film transistor/transparent electrode 11 or the color filter 12. Also in this case when the relationship shown in FIG. 14 is used, the heating temperature difference for reducing the error of the distance between marks can be calculated. It is possible to store equations or tables showing the relationship of FIG. 14 in the heating temperature determining portion 204 and determine a new heating condition from an error of a distance between marks calculated at integrating error calculating portion 203.

Figure 15:
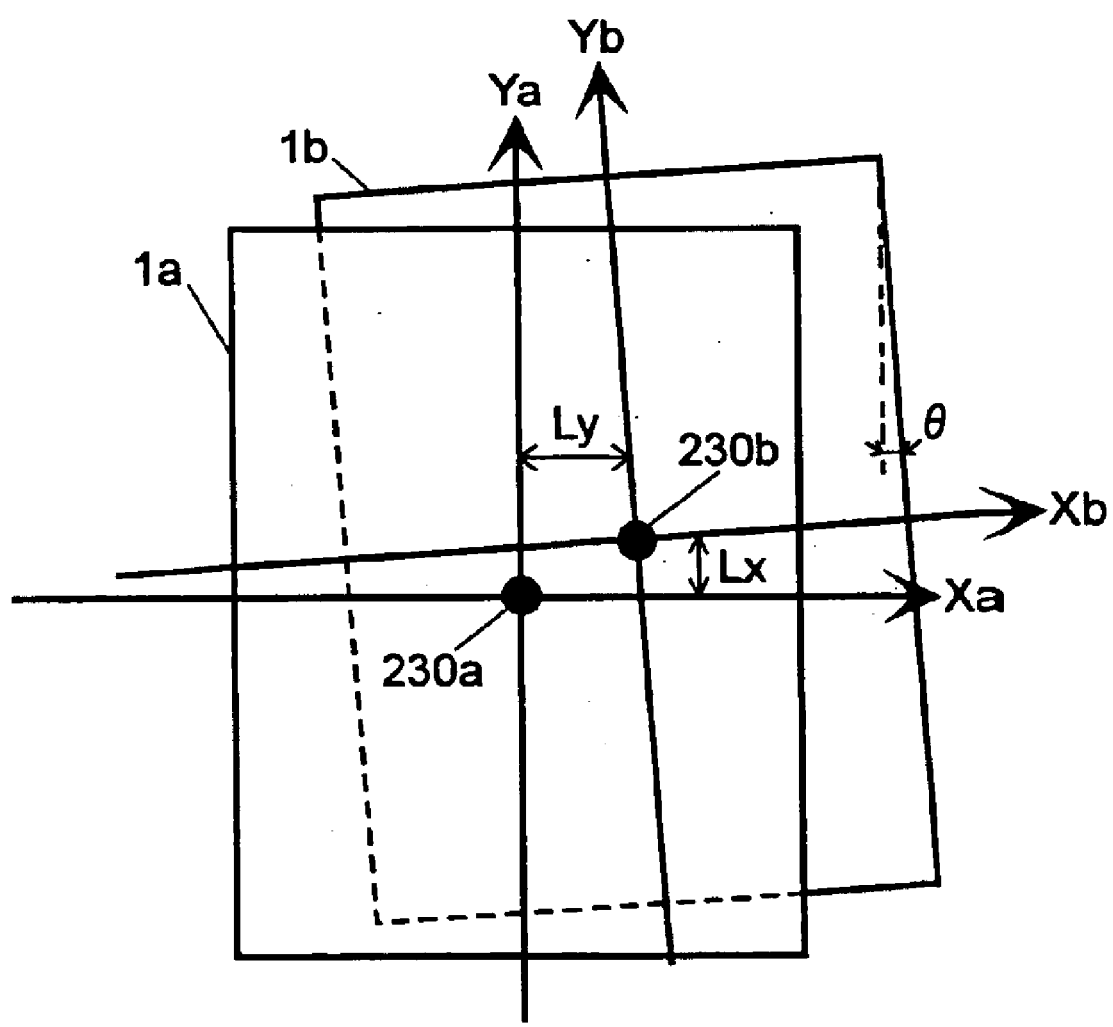
FIG. 15 shows an example indicating a coordinate system superimposed on the liquid crystal panel.

FIG. 15 shows definition of a coordinate system provided on the liquid crystal panel which gravitational center 230a of glass substrate 1a and gravitational center 230b of glass substrate 1b. By defining original points by the gravitational centers 230a and 230b of the glass substrates, the X-axes are delineated in parallel with the short sides of the glass substrates and Y-axes are delineated in parallel with long sides of the glass substrates. The integrating error of the liquid crystal panel is evaluated using the coordinates. A positional shift of glass substrate 1b relative to glass substrate 1a is shown by an error of the gravitational position (Lx, Ly) and an error of angle θ of the glass substrate. With respect to the integrating error of the liquid crystal panel, the coordinate systems are used as follows.

Figure 16:
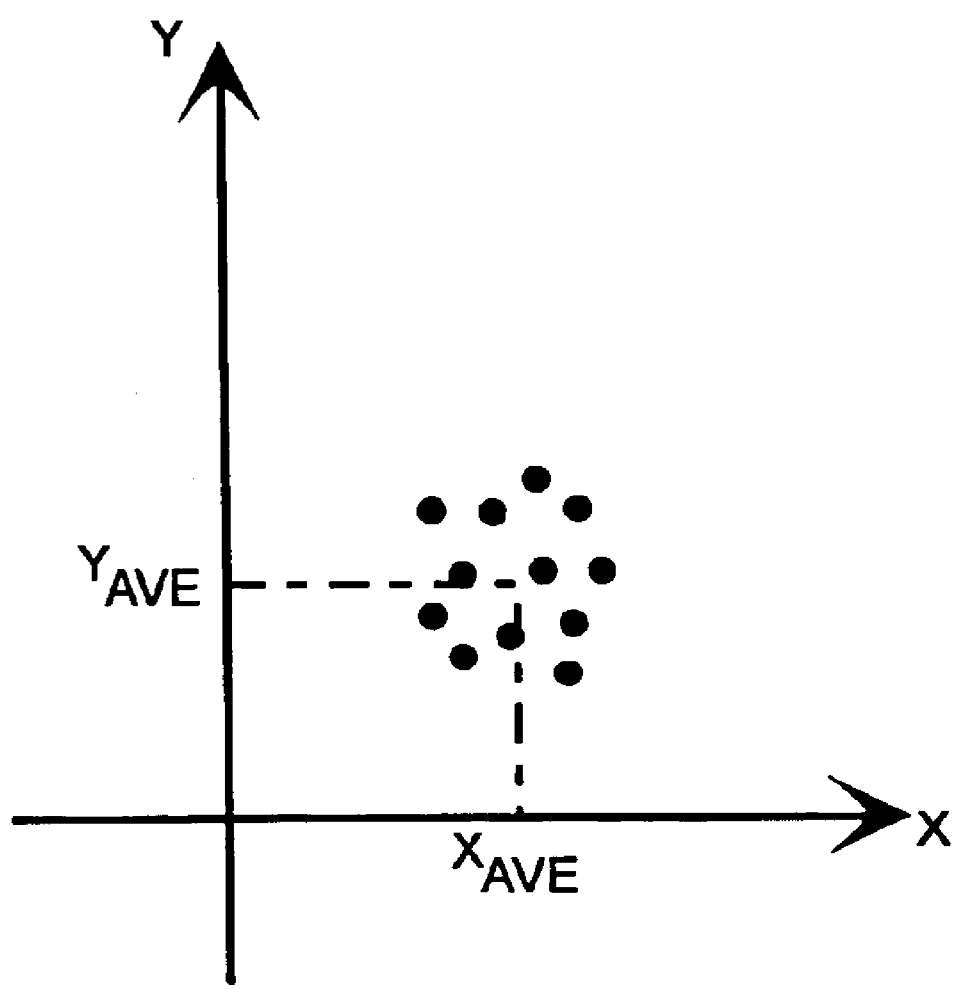
FIG. 16 is a diagram for explaining an integration error.

FIG. 16 shows an example of a result of measuring a position of gravitational center 230b of glass substrate 1b measured by integrating error measuring apparatus 201. Although as shown by FIG. 16 the gravitational position is dispersed, when glass substrate 1b has previously shifted to overlap such that an average value $X_{AVE}$, $Y_{AVE}$ of a measured value becomes "0", the integrating error of the liquid crystal panel can be minimized. The same is true for the inclination θ of the glass substrate. By storing the measured data in overlapping condition determining portion 206, calculating an average value from, for example, the last 20 points and storing the data as an offset amount of overlapping in overlapping condition storing portion 211, the data can be used when overlapping the substrates.

According to the configuration of the embodiment, not only the error of the distance between marks can be reduced by heating, but the overlapping condition and the heating condition in integrating a successive liquid crystal panel can be dynamically changed by measuring the integrating error after integrating the liquid crystal panel, and improving productivity and achieving high-quality formation of the liquid crystal panel.

Figure 17:
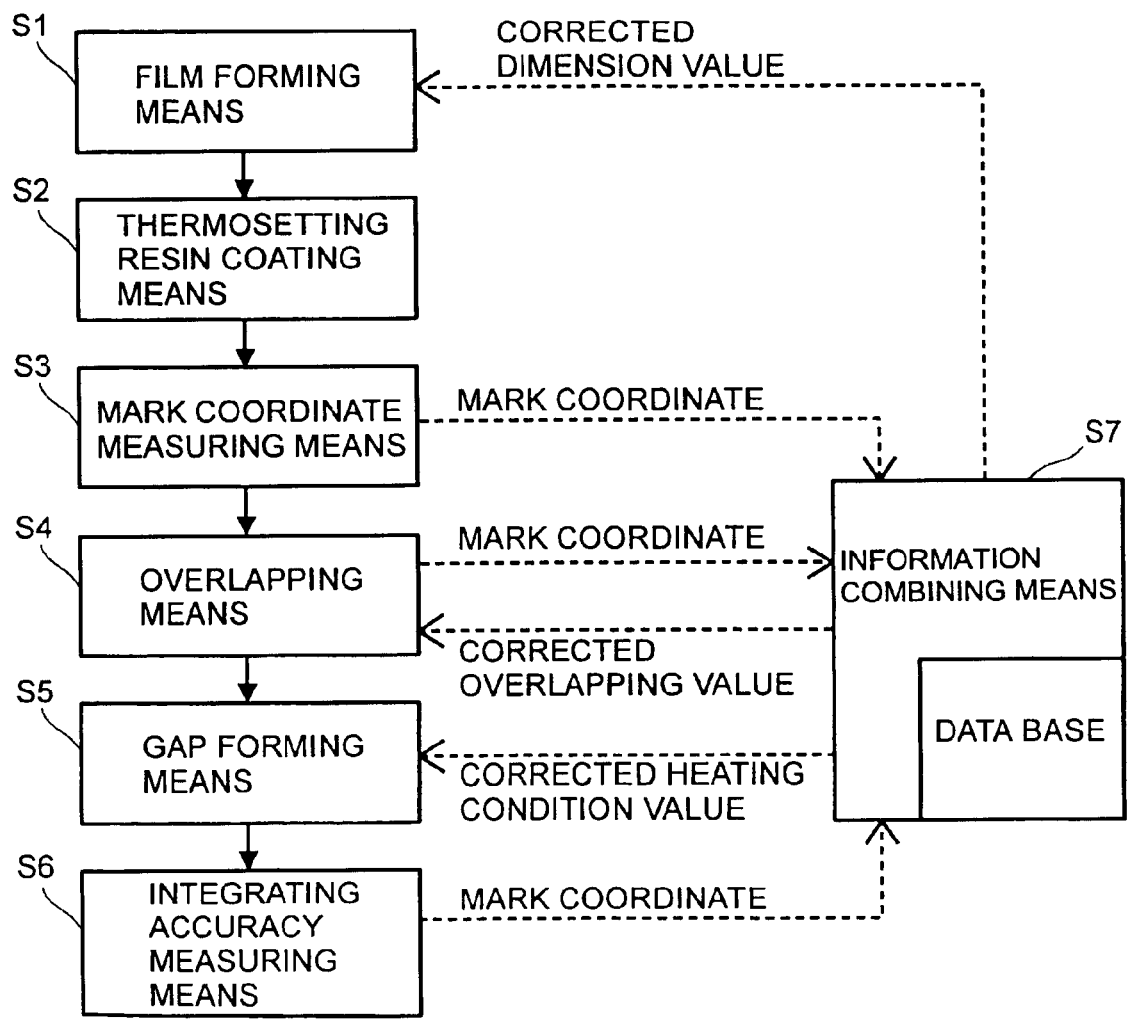
FIG. 17 is a process flow chart showing the steps in manufacturing a panel.

An explanation of a fourth embodiment of a method of manufacturing a liquid crystal panel is now given with reference to FIG. 17. First, film forming means S1 is used to form a thin film transistor/transparent electrode 11 on glass substrate 1a and a color filter 12 is formed on glass substrate 1b. Next, a thermosetting resin coating S2 is applied on one of the two sheets of glass substrates and the positions of the marks on the substrates are measured by mark coordinate measuring means S3. The positions of the marks may be measured before applying the coat of thermosetting resin or may be measured by the thermosetting resin coating means.

At step S4 an overlapping means controls the overlapping of glass substrates 1a and 1b sandwiching thermosetting resin 2 (the workpiece) and temporarily curing the resin. In addition, the positions of the marks measured during overlapping are stored. The next step, gap forming means S5, starts with the workpiece of S4, further heating the glass substrates 1a and 1b while pressing the substrates to thereby cure thermosetting resin 2, resulting in a fused element containing the gap that will hold the liquid crystals.

An integrating accuracy measuring means at step S6 measures errors of the positions of the gravitational centers glass substrates 1a and 1b (Lx, Ly of FIG. 15), the inclination of the substrate ($\theta$ of FIG. 15), and errors of distance between marks (discussed later). An information combining means of step S7 receives the measured values of the positions of the marks from the mark position measuring apparatus of S3, the overlapping apparatus of S4 and the integrating accuracy measuring apparatus of S5 and sets corrected values for the film forming means of S1 or the overlapping means of S4 and the gap forming means of S5 in consideration of the measured values, design dimensions, past measured values, and instructed values stored in a data base.

Figure 18:
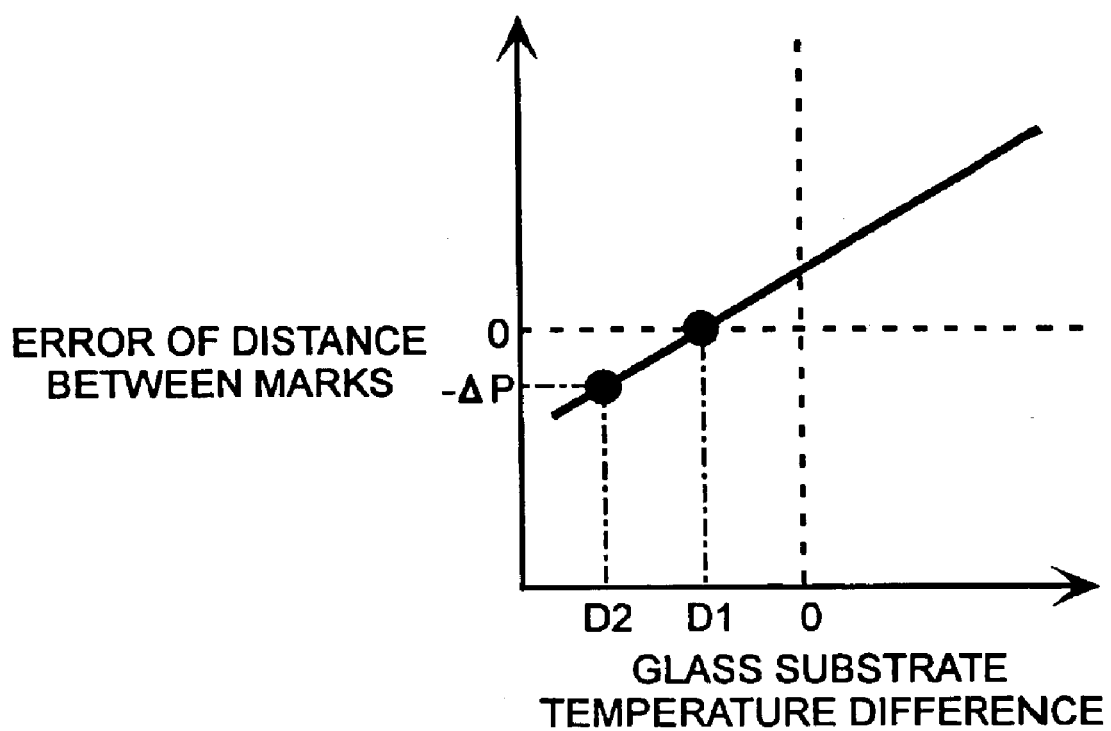
FIG. 18 is an illustration for explaining the correction system when a difference of a distance between marks is shifted from "0" by a variation in process.

FIG. 18 shows an example of feeding back the measured values to the gap forming process. Among the various conceivable causes for error in the distance between marks, are a process variation in a step for forming the thin film transistor/transparent electrodes 11 or color filter 12 and a process variation in formation of the gap. With respect to the variations, when a target value of the heating temperature, which remains constant, is used, a result of measuring the integrating accuracy is varied.

Assume that when a target value of a currently set glass substrate temperature difference is designated by D1, an error of a distance between marks of $\Delta P$ ($\Delta P > 0$) is brought about by a process variation or the like. In order to correct $\Delta P$ produced in this case, a glass substrate temperature difference D2 to make the error of the distance between marks $-\Delta P$ may be calculated from FIG. 18 and the glass substrate temperature difference D2 may be set to a new target value. It is possible to store equations or tables showing the relationship of FIG. 14 in the information combining apparatus, to determine a new heating condition from an error of distance between marks measured by the integrating accuracy measuring apparatus to reduce the integrating error. With respect to a reduction in an error of distance between marks, the reduction can also be dealt with by changing the pattern dimensions of the thin film transistor/transparent electrode 11 or the color filter 12.

Figure 19:
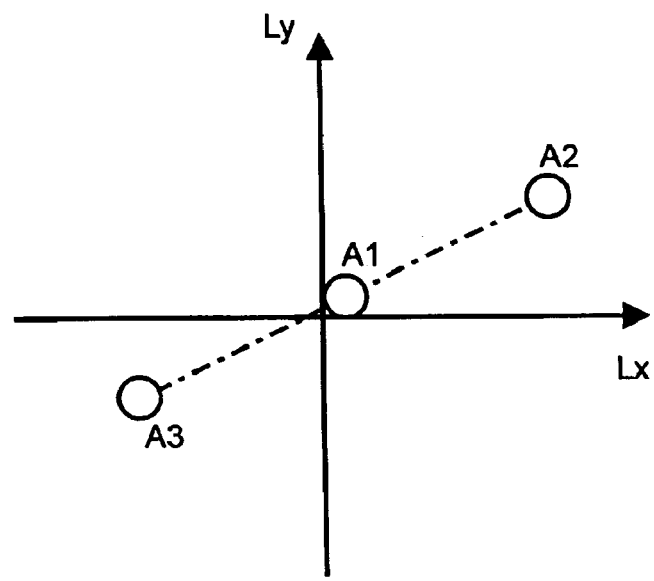
FIG. 19 is an illustration for explaining feeding back an integration error to the liquid crystal panel overlapping process.

FIG. 19 shows an example of feeding back the measured values to the liquid crystal panel overlapping process. Glass substrates 1a and 1b are overlapped while positioning the substrates using the overlapping apparatus, and are then pressed by the gap forming apparatus. The pressing operation can generate a force that shifts the glass substrate laterally because of aging changes in sheets 3a and 3b. Assume that A1 represents information about the positions of the marks sent by the overlapping apparatus to the information combining apparatus and the result of calculating the integrating error of the glass substrate, and that A2 represents the integrating error measured by the integrating accuracy measuring apparatus after the gap formation. Here, FIG. 19 uses the coordinate system shown in FIG. 15.

It is known that the integrating error is changed from A1 to A2 in forming the gap and therefore, glass substrates 1a and 1b may be overlapped by anticipating the change amount. In FIG. 19, the substrates may be overlapped by a positional relationship indicated by position A3 in point symmetry with A1 of A2. Although only the X and Y directions are shown here for convenience of explanation, the corrected value can similarly be determined by adding the inclination $\theta$ of the substrate. Further, in a case in which the integrating error in overlapping is sufficiently small, that is, when A1 is disposed at the original point, it is possible to use only the measurement result at the integrating accuracy measuring apparatus to determine the corrected value by a similar method by assuming that A1 is disposed at the original point. Further, by generating a warning when the difference between A1 and A2 exceeds a constant value and adjusting or replacing sheet 3a or 3b, the integrating accuracy can also be improved.

Figure 20:
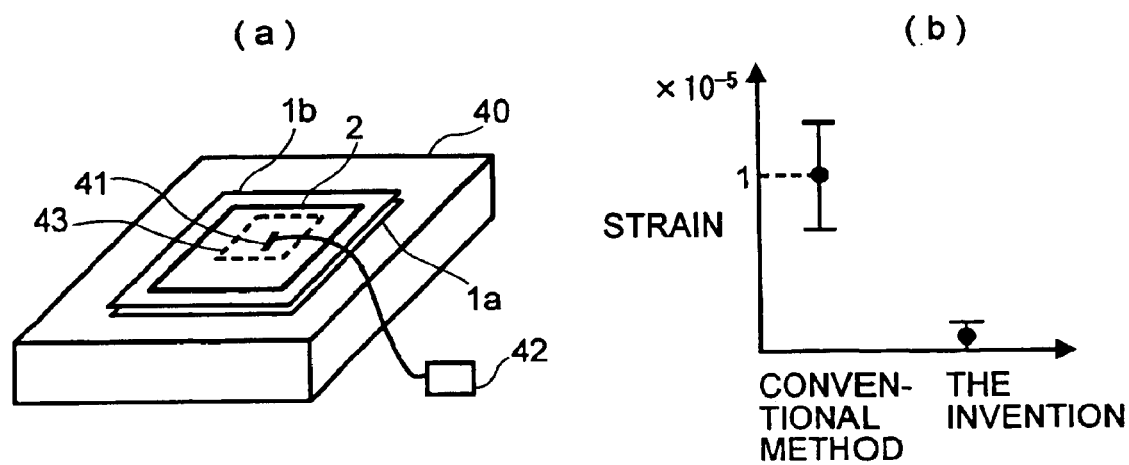
FIGS. 20a and 20b show an example of measuring residual stress on a substrate.

To verify the effectiveness of the embodiment, residual stress of glass substrate 1b is measured by a structure shown in FIG. 20A, which includes a level block 40, a strain gage 41, a strain meter 42 and a cutting line 43. After curing seal 2, the workpiece of the glass substrates 1a, 1b is placed on the level block 40. At this time, the workpiece flattens under its own weight and follows the form of the block. While the glass is in this state, strain gage 41 is pasted on the surface of the substrate 1b and is connected to strain meter 42. The value measured at this time is E1. Next, glass substrate 1b is cut along cutting line 43, releasing the residual stress of the substrate, and strain gage 41 is elongated or contracted to measure the strain. The measured value at this time is E2. The difference between E2 and E1 is the strain of the substrate in integrating. FIG. 20B shows a result of this measurement. It is known that strain is reduced in the system of the invention compared to the conventional systems. As a result, it is possible to improve integrating accuracy by reducing warping of the substrate and to reduce the disadvantage of having to disconnect a transparent electrode 11 putting strain on the glass substrate. A product of the strain measured here and Young's modulus is the residual stress of the substrate. Another method of measuring the residual stress is with a polarimeter, and a similar result is obtained. According to the embodiment, the integrating error can be reduced by measuring and controlling the integrating accuracy and swift feedback operation and, therefore, improvement of productivity and high-quality formation of the liquid crystal panel can be achieved.

Figure 21:
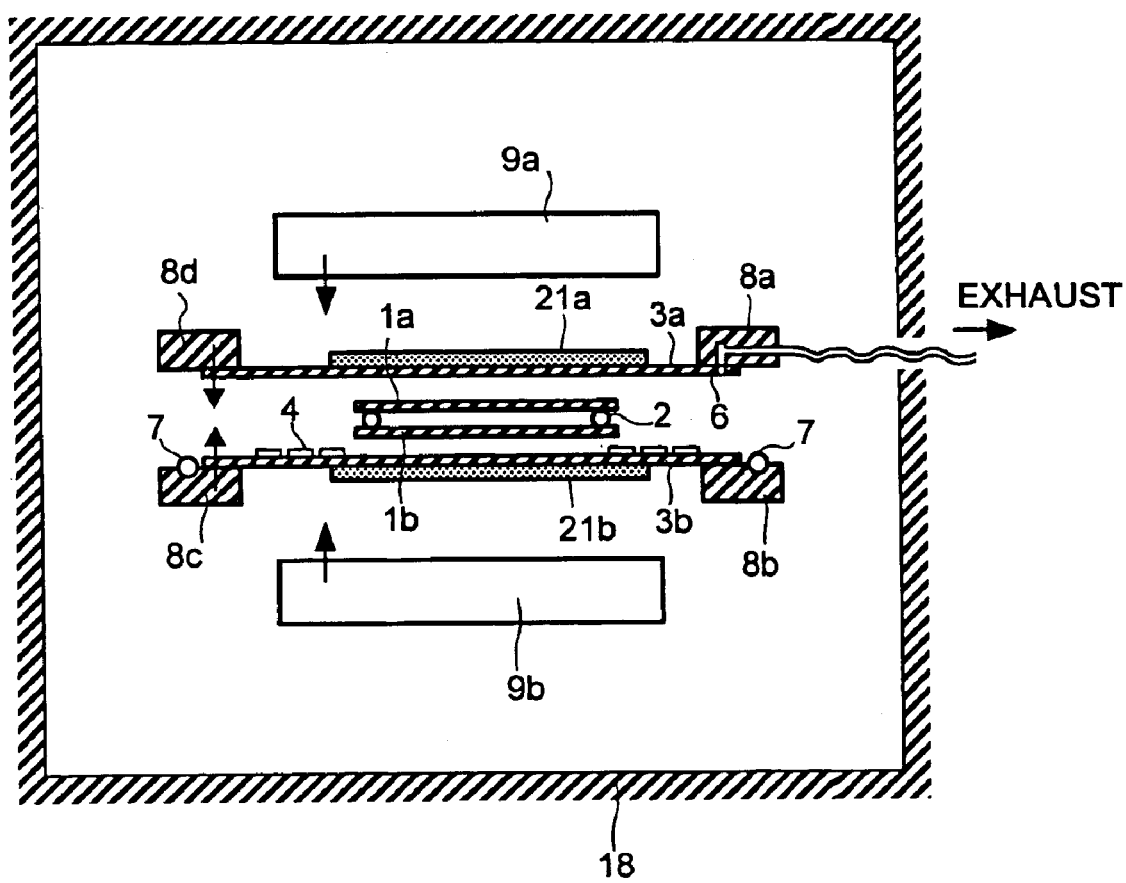
FIG. 21 is a cross-sectional view of a glass substrate processing portion of a liquid crystal panel manufacturing apparatus according to a second embodiment of the present invention.

FIG. 21 shows a fifth embodiment which includes a heat conductivity adjusting portion 21a and 21b, a which is made of a material having an effect of changing a heat conductivity. Similar to FIG. 1, the work piece as thermosetting resin 2 sandwiched between glass substrates 1a and 1b is transferred and positioned to inside chamber 18. After positioning, the workpiece is enveloped by sheets 3a and 3b to create a substantially hermetically closed state. In the this state, air inside the space created by the sheets is exhausted from exhaust port 6 and the space inside the sheets is decompressed to press substrates 1a and 1b with atmospheric pressure on sheets 3a and 3b. Heating is carried out to cure thermosetting resin 2 and even when the generated heat amounts of heaters 9a and 9b are the same, the amounts of heat conducted to glass substrates 1a and 1b are changed by passing heat conductivity adjusting portions 21a and 21b and a state can be created in which the temperatures of glass substrates 1a and 1b differ from each other. Further, even when the heat conductivity adjusting portions 21a and 21b are pasted to the glass substrate sides of the sheets 3a and 3b, a similar effect is achieved. Further, when the heat conductivity adjusting portions 21a and 21b are made of plastic heat-generating bodies or the generated heat amounts of the heaters 9a and 9b can be set independently from each other, integrated liquid crystal panels of several kinds of combinations having different heat expansion coefficients can be used in the process.

Further, in FIG. 21, there may be a system constituting a structure capable of removing sheets 3a, 3b, sheet holding members 8a, 8b, 8c and 8d and the parts that transfer glass substrates 1a and 1b outside chamber 18 and thereafter transfer workpieces to be newly positioned into the chamber. According to this embodiment, an effect similar to that of the embodiment of FIG. 1 is achieved and a high quality liquid crystal panel can be manufactured.

Figure 22:
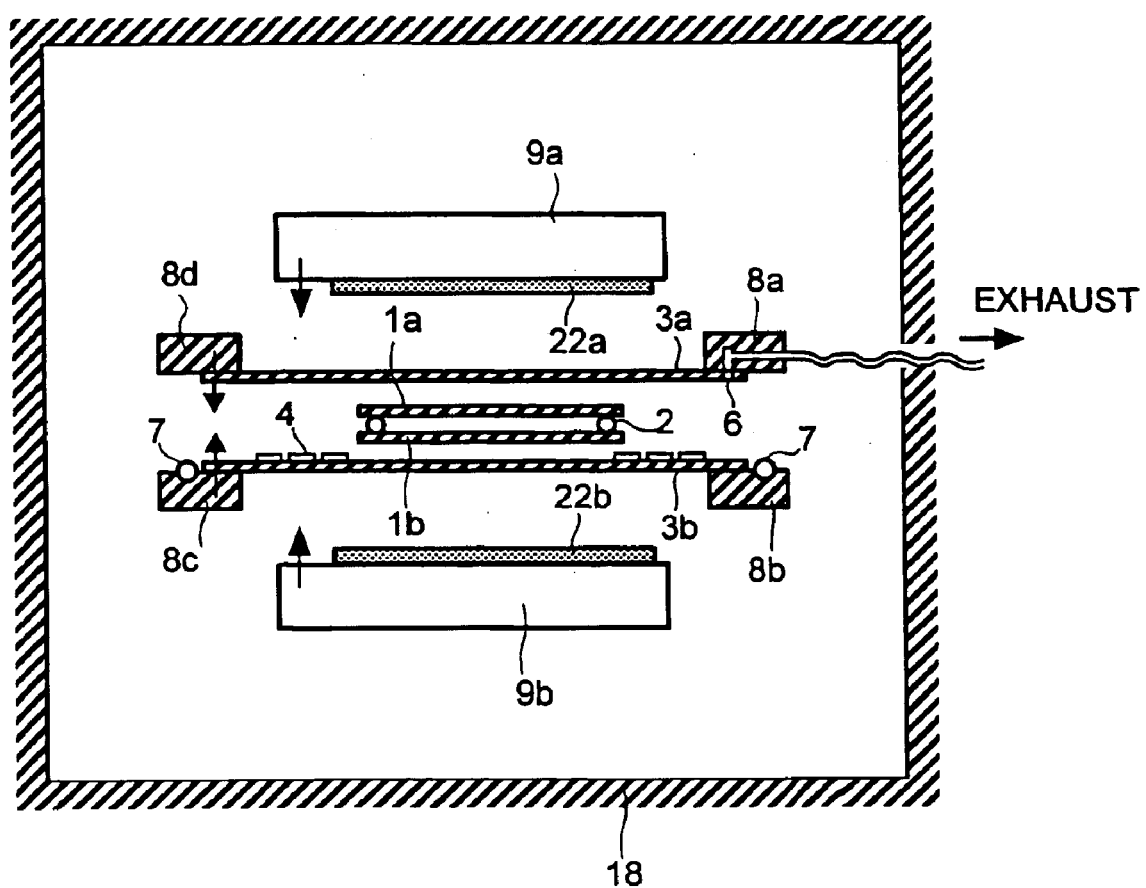
FIG. 22 is a sectional constitution view of a glass substrate processing portion of a liquid crystal panel manufacturing apparatus according to a third embodiment of the present invention.

FIG. 22 shows a sixth embodiment in which other heat conductivity adjusting portions 22a and 22b are made of a material capable of changing heat conductivity. Similar to FIG. 1, the workpiece, thermosetting resin 2 sandwiched between glass substrates 1a and 1b, is transferred and positioned inside chamber 18. After positioning, the workpiece is enveloped by sheets 3a and 3b to create a substantially hermetically closed state. In this state, with the workpiece enveloped by the sheets, air is exhausted from exhaust port 6 to decompress the interior space, and atmospheric pressure is used to press substrates 1a and 1b with sheets 3a and 3b. Although heating is carried out for curing thermosetting resin 2, even when heat amounts generated by heaters 9a and 9b are the same, the amounts of heat conducted to glass substrates 1a and 1b are changed by omitting heat conductivity adjusting portions 22a and 22b and a state in which temperatures of glass substrates 1a and 1b differ from each other can be created. Further, although the heat conductivities of heat conductivity adjusting portions 22a and 22b are the same, a similar effect is achieved even when the thicknesses thereof differ from each other. Further, when the heat amounts generated by heaters 9a and 9b can be set independently from each other, liquid crystal panels of several kinds of combinations having different heat expansion rates can be integrated.

Further, in the embodiment shown in FIG. 22, there may be a system constituting a structure capable of removing sheets 3a and 3b, and sheet holding members 8a, 8b, 8c and 8d and the parts that transfer glass substrates 1a and 1b, outside of the chamber 18 and transfer the workpieces to be newly positioned into chamber 18. According to this embodiment, an effect similar to that of the embodiment of FIG. 1 is achieved and a high-quality liquid crystal panel can be manufactured.

Figure 23:
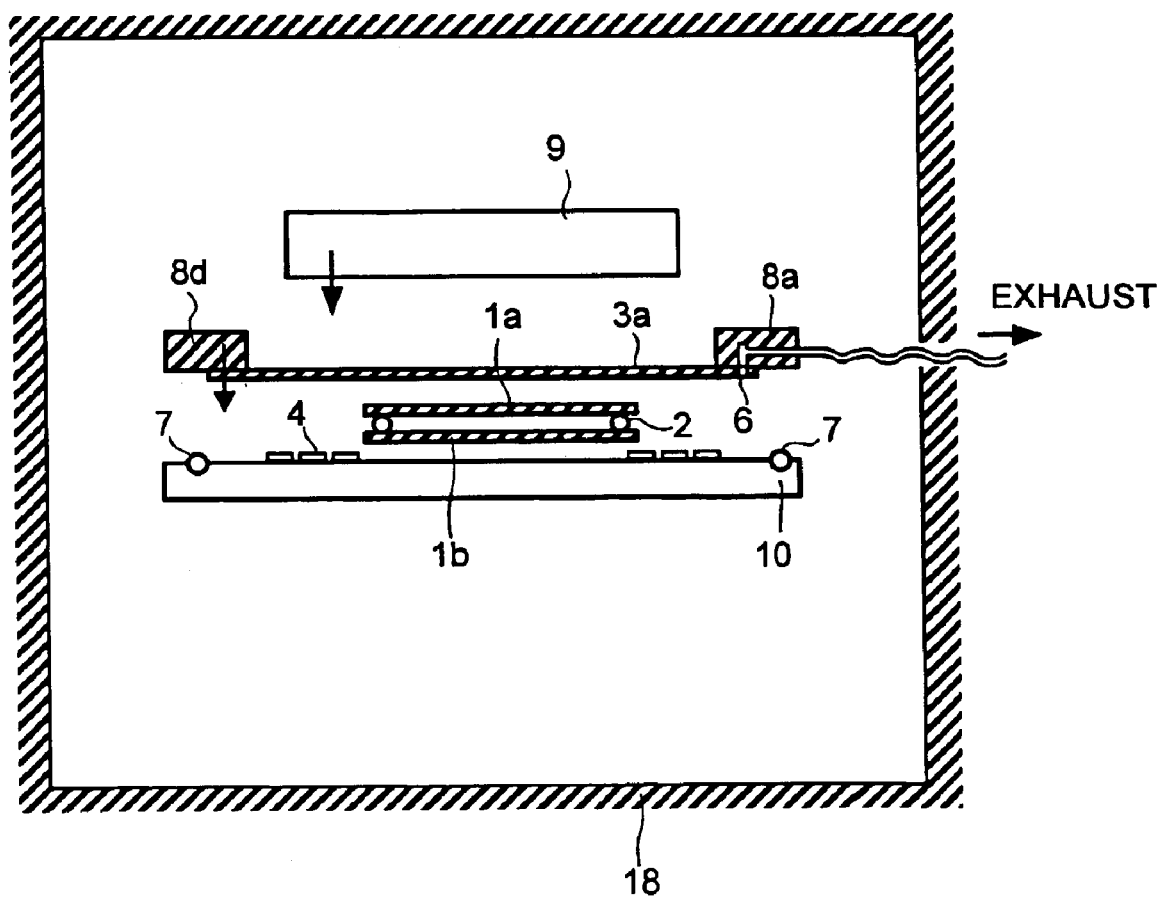
FIG. 23 is a sectional constitution view of a glass substrate processing portion of a liquid crystal panel manufacturing apparatus according to a fourth embodiment of the present invention.

FIG. 23 shows a seventh embodiment in which the configuration, other the apparatus other than the gap-forming apparatus, is the same as that of the embodiment of FIG. 1. In FIG. 23 a heater 10 is shown having a highly flat and highly rigid plane. Similar to FIG. 1, the workpiece, which sandwiches thermosetting resin 2 between glass substrates 1a and 1b is transferred and positioned inside chamber 18. After the workpiece is positioned, sheet 3 is moved down from above the piece, and a space between sheet 3 and heater 10 is brought into a substantially hermetically closed state with the piece enveloped therein. In this state, with the workpiece enveloped by the sheet and the heater, air is exhausted at exhaust port 6 to decompress the interior, and substrates 1a and 1b are pressed with the atmospheric pressure exerted on sheet 3. At this time, flatness of the substrate is ensured by using the flatness and high rigidity of heater 10.

Simultaneously with the pressing, heating is carried out from both top and bottom by heaters 9 and 10, which can individually change the amounts of heat generated, and heater 9 can alter the distance to sheet 3 his mechanism allows glass substrates 1a and 1b to be heated at different temperatures. Further, temperature increase rates and the temperatures to be reached for glass substrates 1a and 1b can be changed by pasting a material that changes the heat conductivity on a surface of heater 10 or by changing the thickness or heat conductivity of sheet 3. Further, sheet 3 may have a plastic heat generating body attached to it. After the thermosetting resin is cured, the space surrounded by the sheet 3 and the heater 10 is released from the decompressed state and atmospheric pressure is restored. After the atmospheric pressure releasing sheet 3 is moved up and the fused element is transferred out of chamber 18 by the transfer mechanism. According to this embodiment, an effect similar to that of the embodiment of FIG. 1 is achieved and improvement of productivity and high-quality formation of the liquid crystal panel can be achieved.

Figure 24:
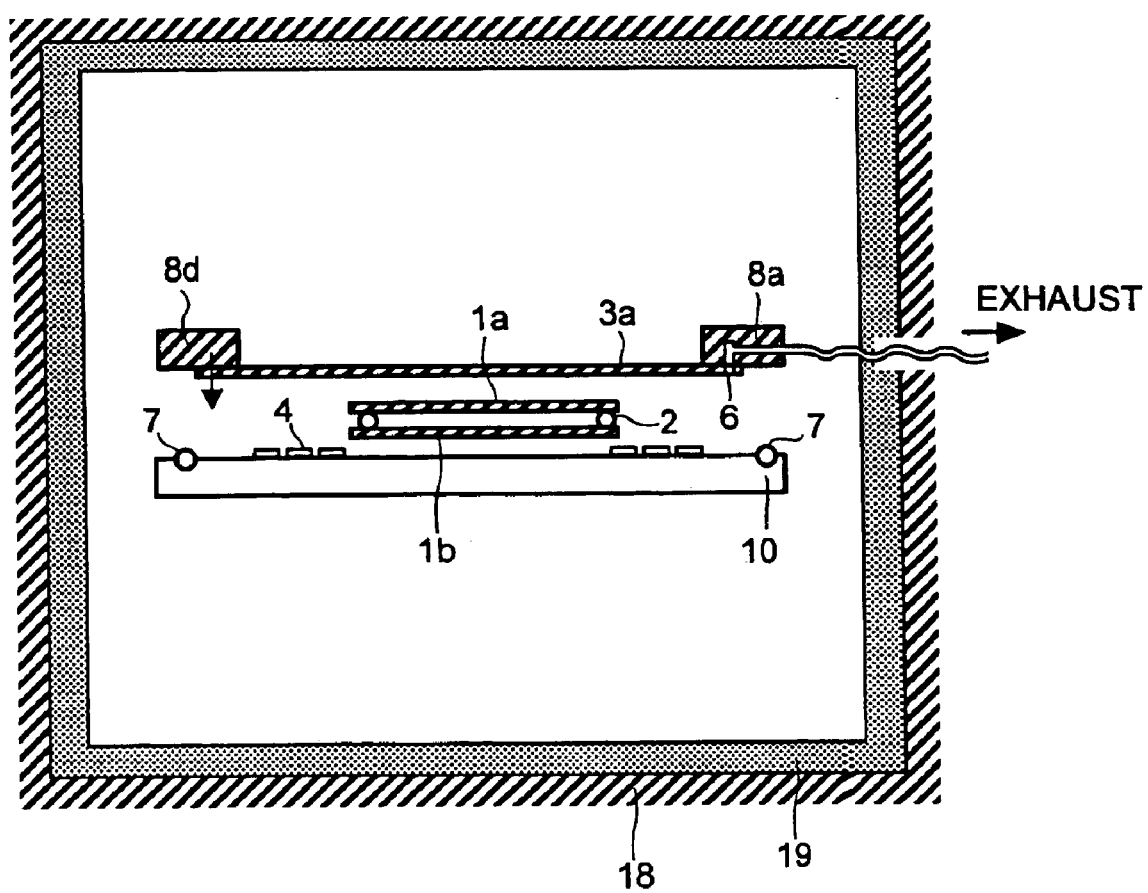
FIG. 24 is a sectional constitution view of a glass substrate processing portion of a liquid crystal panel manufacturing apparatus according to a fifth embodiment of the present invention.

FIG. 24 shows a eighth embodiment, in which the configuration, other than the gap-forming apparatus is the same as that of the embodiment of FIG. 1. In FIG. 13, an insulating material 19 is attached to the interior of chamber 18 and a mechanism capable of arbitrarily setting the interior temperature. After glass substrates 1a and 1b are enveloped in the space between the 3 and heater 10, the space is exhausted and brought into a pressurized state. The interior of chamber 18 is heated to a set temperature to heat glass substrates 1a and 1b and thermosetting resin 2. Glass substrate 1b is further heated by heater 10; therefore, glass substrates 1a and 1b can be heated to different temperatures. After the thermosetting resin has been cured, the fused element of the seal sandwiched between the glass substrates is transferred out of chamber 18. According to the embodiment, an effect similar to that of the embodiment of FIG. 1 is achieved and improvement of productivity and high-quality formation of a liquid crystal panel can be achieved.

Figure 25:
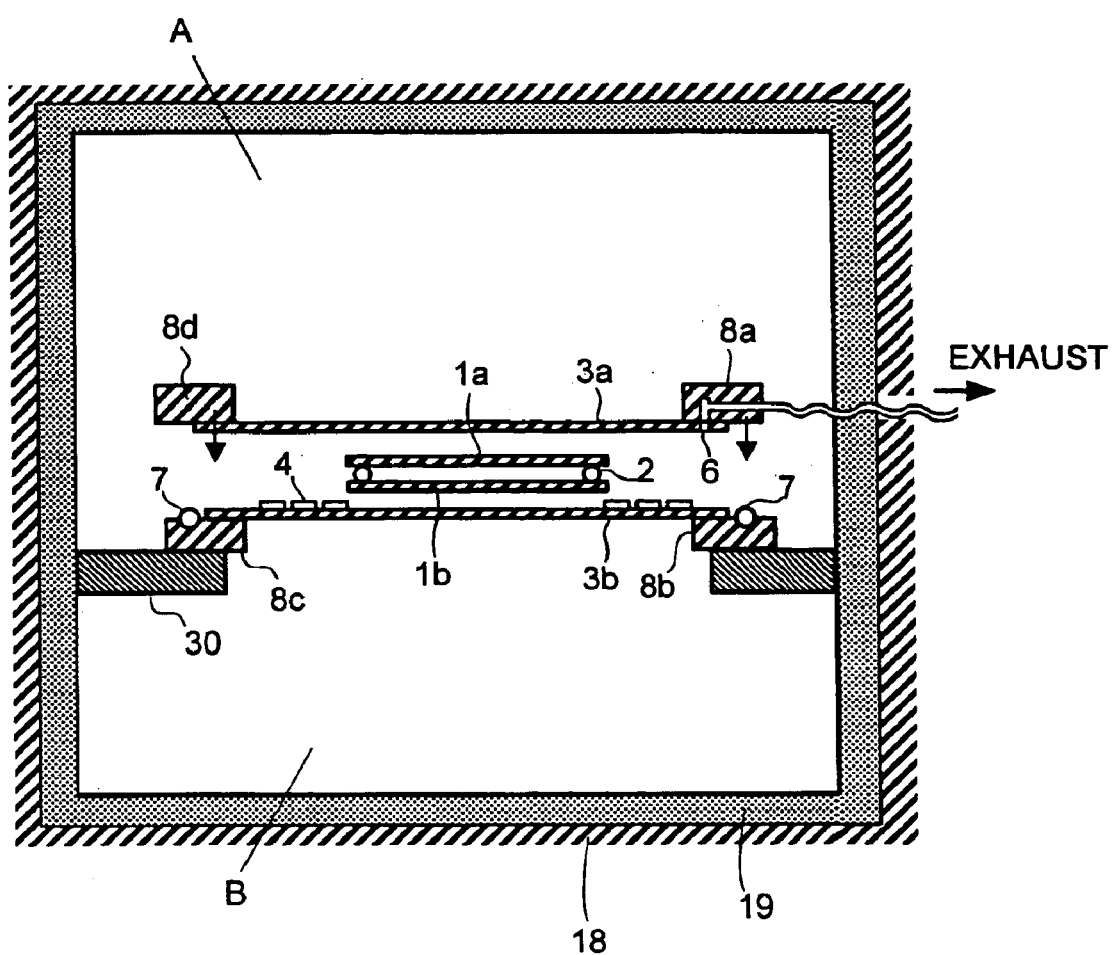
FIG. 25 is a sectional constitution view of a glass substrate processing portion of a liquid crystal panel manufacturing apparatus according to a sixth embodiment of the present invention.

FIG. 25 shows a ninth embodiment according to the invention. After enveloping the glass substrates 1a and 1b in a space between the sheets 3a and 3b, the space created by the envelopment is exhausted and is brought into a pressurized state. The interior of chamber 18 is lined with insulating material 19 and divided into heating chamber A and heating chamber B by a partition wall 30 and the sheet 3b. The heating chambers can be set to arbitrary temperatures. By changing temperatures inside heating chambers A and B, a state can be created in which the temperatures of glass substrates 1a and 1b differ from each other by their changing heating temperatures. After the thermosetting resin is cured, the fused element is transferred out of chamber 18. Further, in FIG. 25, there can be configured a system constituting a structure capable of removing parts that transfer glass substrates 1a, and 1b outside chamber 18 and transferring a workpiece to be newly positioned into chamber 18. According to the embodiment, an effect similar to that of the embodiment of FIG. 1 is achieved and a high-quality liquid crystal panel can be manufactured.

Figure 26:
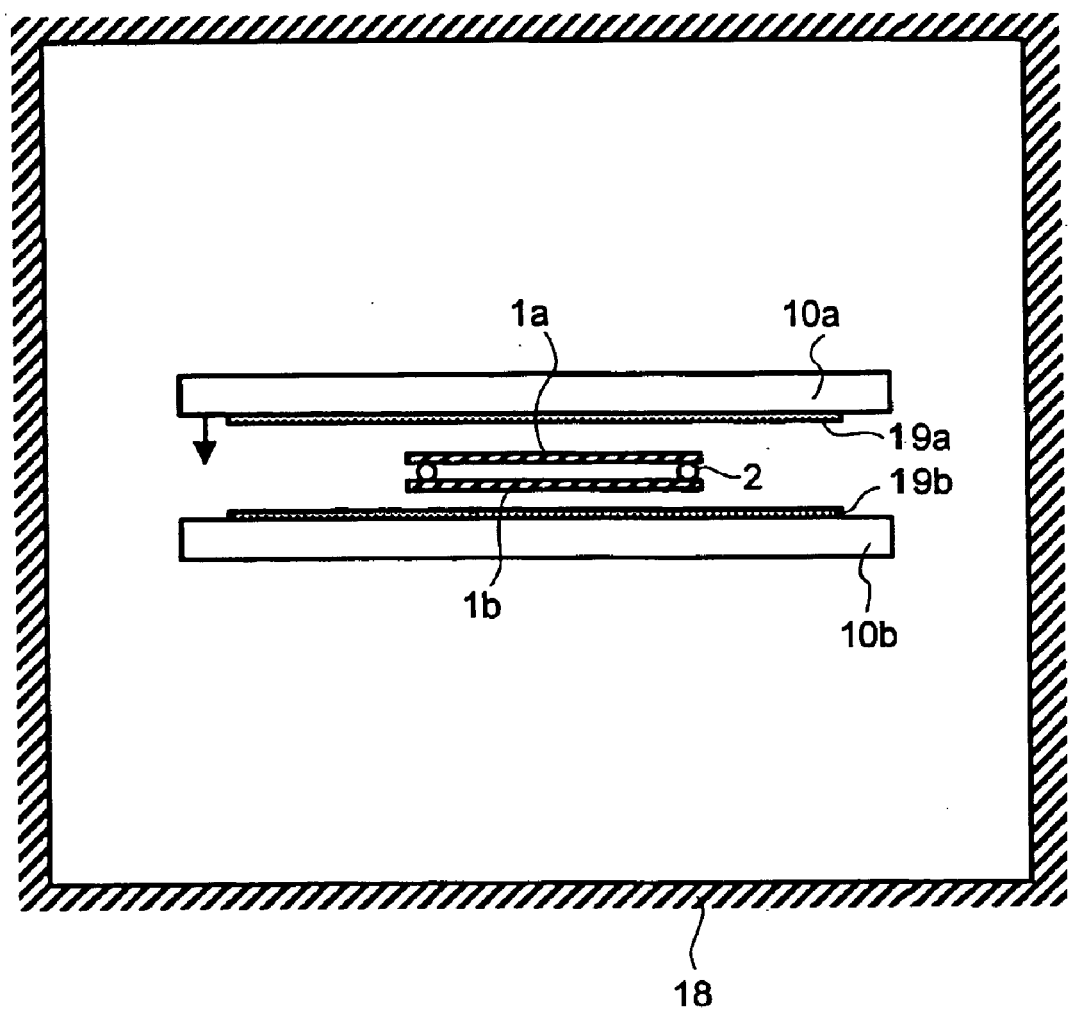
FIG. 26 is a sectional constitution view of a glass substrate processing portion of a liquid crystal panel manufacturing apparatus according to a seventh embodiment of the present invention.

FIG. 26 shows a tenth embodiment is the same as that of the embodiment of FIG. 1 except for the configuration of the gap-forming apparatus. FIG. 26 shows 16a and 16b designate highly flat and highly rigid stages, notations 17a and 17b are flexible heaters. Similar to FIG. 1, the piece is the thermosetting resin 2 sandwiched between glass substrates 1a and 1b; the workpiece has been transferred and positioned to inside chamber 18. After the workpiece is positioned, the heater 10a is moved down to constitute a pressurized state.

The heaters 10a and 10b are set to generate different amounts of heat and glass substrates 1a and 1b can be heated at different temperatures. When the two rigid bodies of the heaters 10a and 10b are overlapped, it is difficult to exactly match the flatness and parallelism of heaters 16a and 16b and therefore, generally, surfaces in contact with the glass substrates 1a and 1b are pasted with flexible sheets 19a and 19b. The heating temperatures of glass substrates 1a and 1b can also be changed by changing the heat conductivities of the flexible sheets. Further, the heating temperatures of glass substrates 1a and 1b can also be changed by making heaters 10a and 10b with highly flat and highly rigid stages and pasting the generating bodies 19a and 19b. In this case, the heat capacities of heat generating bodies 19a and 19b can be reduced and as a result, the advantage of facilitating control of the heating process is achieved. Further, in order to prevent heat to a heater stage from being scattered, interposing insulating members can be built between heating bodies 19a and 19b and heater stages 10a and 10b. According to the embodiment, an effect similar to that of the embodiment of FIG. 1 is achieved and improvement of productivity and high-quality formation of the liquid crystal panels can be achieved.

Figure 27:
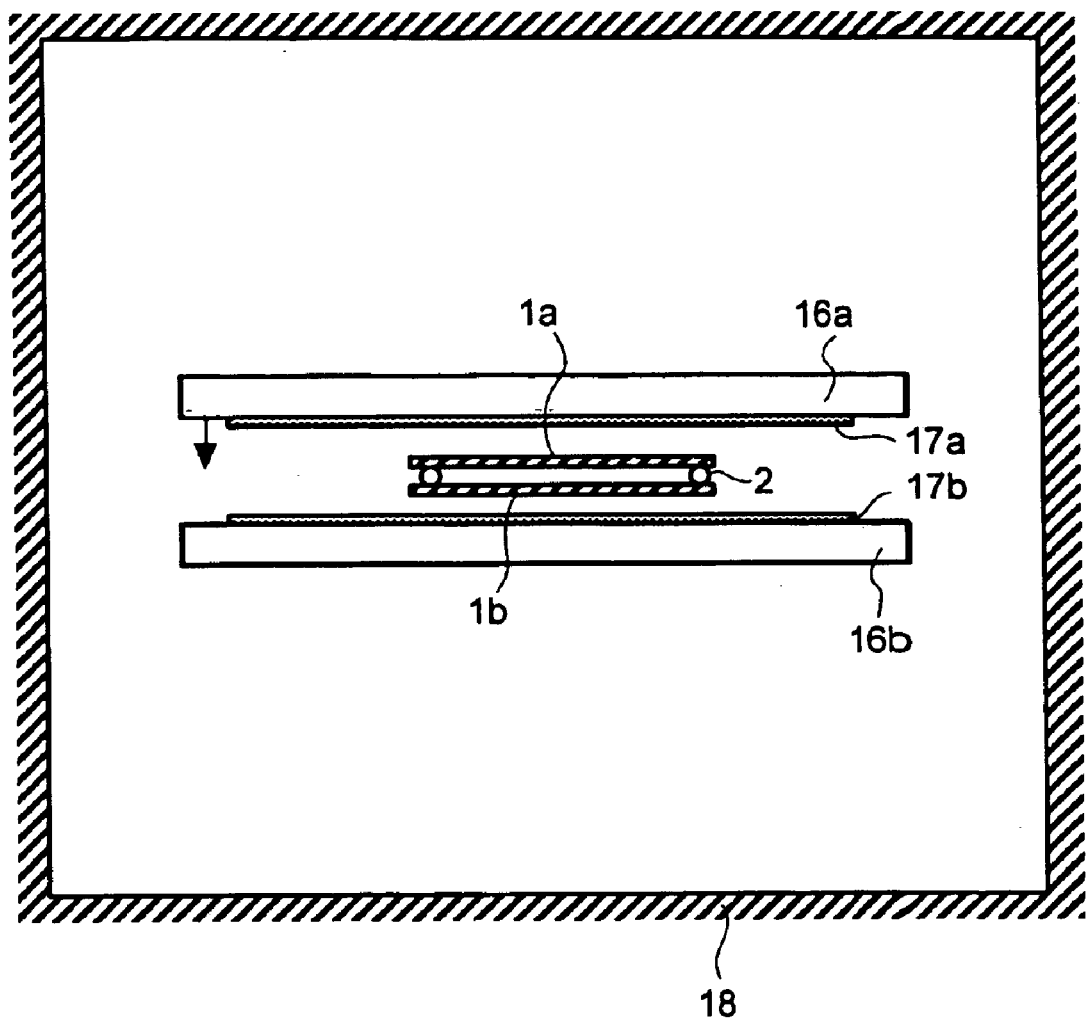
FIG. 27 is a sectional constitution view of a glass substrate processing portion of a liquid crystal panel manufacturing apparatus according to a eighth embodiment of the present invention.

FIG. 27 shows an eleventh embodiment which includes highly flat, highly rigid stages 16a and 16b and flexible heaters 17a and 17b. Similar to the embodiment of FIG. 1, the workpiece sandwiching thermosetting resin 2 between glass substrates 1a and 1b is t inside chamber 18. After the workpiece is positioned, the stage 16a is moved down to produce a pressurized state. Heaters 17a and 17b are set generate different amounts of heat and a state can be produced in which the temperatures of glass substrates 1a and 1b differ from each other. According to the embodiment, the heat capacities of heaters 17a and 17b can be reduced; as a result, the advantage of facilitating control of the heating process is achieved. Further, in order to prevent heat to the stage from being scattered, interposing insulating members may be built between heat generating bodies 17a and 17b and stages 16a and 16b. According to the embodiment, an effect similar to that of the embodiment of FIG. 1 is achieved and a high-quality liquid crystal display panel can be manufactured.

Figure 28:
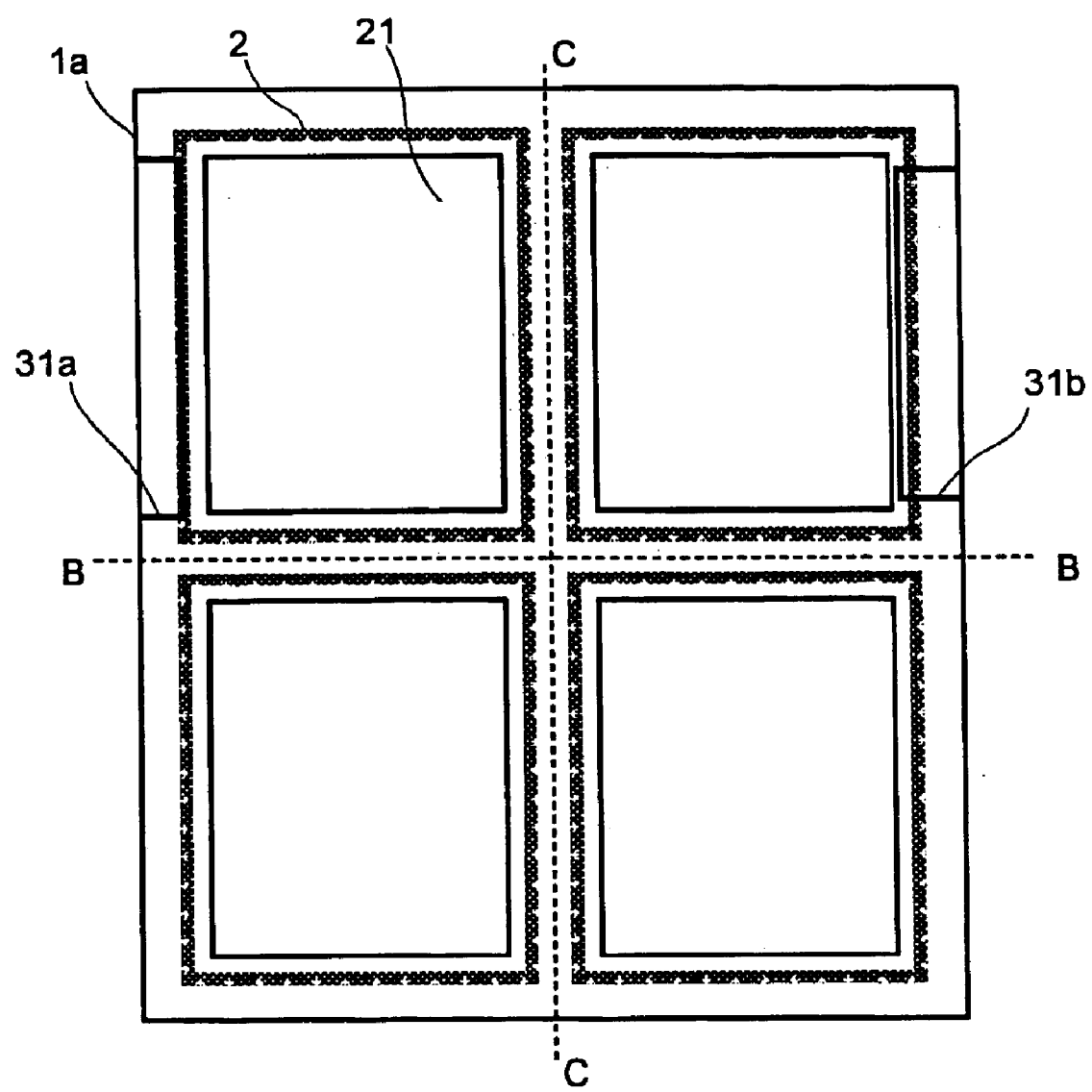
FIG. 28 is an explanatory view of a mechanism for measuring stress on a glass substrate.
Figure 29:
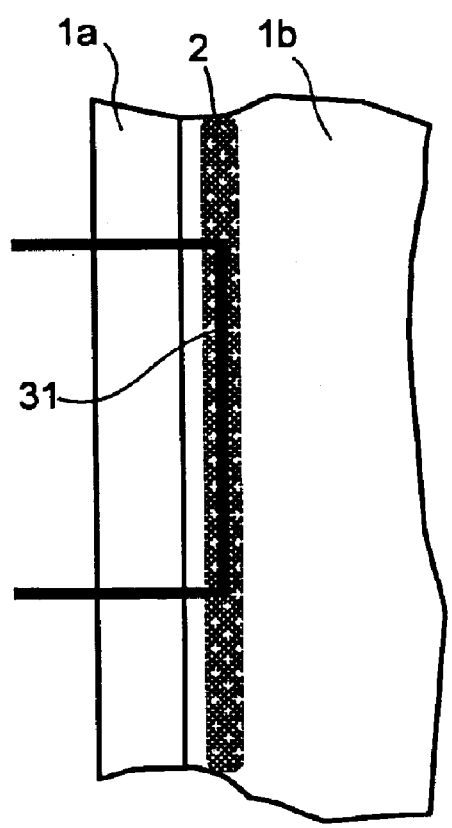
FIGS. 29A and 29B are views enlarging the mechanism of FIG. 28.
Figure 29:
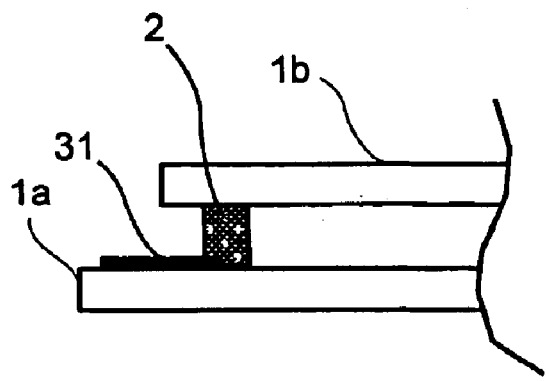

FIGS. 28 and 29a and 29b show a twelfth embodiment with respect to a mechanism for measuring strain on a glass substrate. FIG. 28 an area holding liquid crystals 21 and numeral wiring formed simultaneously the creation of the TFT element (not shown). Wiring 31a is an example of placing wiring for a circuit connection at a position coated with the thermosetting resin 2 and a wiring 32b is an example of placing wiring on the side of a panel where the liquid crystal holding area 21 (gap) will be formed and then sealed with the thermosetting resin. This wiring placement is used because when the glass substrate is cut by, for example, at cutting lines B—B and C—C, stress generated at the gap-forming step is limited to the area surrounded by the thermosetting resin.

When a length of the glass substrate is changed, for example, elongated, wiring 31 is also simultaneously elongated to change the resistance of wiring 31. By measuring the change between resistance values before overlapping the substrate and after forming the gap, elongation of the wiring can be calculated and the stress applied to the glass substrate can be calculated thereby. Control of stress on the glass substrate can be used to prevent inner stress from cracking the glass substrate, to prevent stress-related disconnection of the wiring on the glass substrate since the wiring is similarly elongated, and to prevent an integrating error of stress-created warping of the substrate.

FIGS. 29A and 29B show enlarged views of a portion of wiring 31. FIG. 29a is a plane view and FIG. 29b is a sectional view taken along a line Q—Q of FIG. 29a. For example, when wiring 31 is formed on a surface of substrate 1b on the side of substrate 1a, in order to bring a probe into contact with the wiring 31, substrate 1a needs to be removed Generally, in order to connect a circuit of a TFT element, as shown by FIGS. and, a stepped difference is provided at an end of the substrate and the probe can easily be brought into contact with the wiring 31. Further, there may be provided a contact-free method of measuring stress by measuring the wiring resistance between an antenna and the wiring 31, and simultaneously making a drive circuit for outputting a signal by the antenna. With this embodiment, stress applied on the glass substrate and warping of the substrate can be controlled; consequently, improvement of reliability, yield and integrating accuracy of the liquid crystal panel can be achieved.

According to the invention, with respect to the glass substrate and resin for holding the liquid crystals, heating in consideration of the difference of the heat expansion rate can be carried out and high-quality formation of a liquid crystal panel can be achieved by preventing the shifting or warping of the glass substrate. Further, by continuously monitoring a manufacturing line, variation in the process can swiftly be fed back; therefore, the quality of the liquid crystal panel can stably be maintained. Further, because confirmation and readjustment of the process conditions are dispensed with, the liquid crystal panel can be manufactured without stopping the manufacturing line and productivity of the liquid crystal panel can be further improved.

What is claimed is:

1. A method of manufacturing a liquid crystal panel having a pair of glass substrates formed with a TFT element and a color filter on respective glass substrates and surrounding a liquid crystal holding area by a thermosetting resin between the pair of glass substrates, the method comprising:

a first step of forming two or more alignment marks on the respective glass substrates;

a second step of coating the thermosetting resin onto one of the glass substrates;

a third step of measuring and storing coordinates of the marks formed on the glass substrates;

a fourth step of overlapping the two sheets of glass substrates to sandwich the thermosetting resin while positioning the glass substrates such that relative positions of the marks provided on the two sheets of glass substrates are aligned in accordance with previously stored values, storing the positions of the marks and calculating and storing an error between positions of gravitational centers of the two sheets of glass substrates, an inclination between the substrates and a difference between distances between the marks thereof by using a previously stored equation or table;

a fifth step of curing the thermosetting resin by heating the two sheets of substrates independently based on said previously stored values for the respective substrates while pressing the substrates together at a predetermined pressure;

a sixth step of cooling the glass substrates; and a seventh step of measuring and storing the positions of the marks on the two sheets of glass substrates and storing the error between the positions of the gravitational centers of the two sheets of the glass substrates, the inclination between the substrates and the difference between the distances between the marks using the previously stored equation or table.

2. The method of manufacturing a liquid crystal panel according to claim 1 wherein in the fifth step the thermosetting resin is cured in a state in which temperatures of the two sheets of glass substrates differ from each other by at least one of heating the two sheets of glass substrates to different temperatures and heating the two sheets of glass substrates via sheets having different heat conductivities.

3. The method of manufacturing a liquid crystal panel according to claim 1 wherein in the third step, the coordinates of the marks are measured at least once immediately before or after coating the thermosetting resin.

4. The method of manufacturing a liquid crystal panel according to claim 1 wherein at least one of a target value of a relative position of the mark in the fourth step or a target value of the heating temperature in the fifth step is determined and stored from the error between the positions of the gravitational centers of the two sheets of glass substrates, the inclination between the substrates and the difference between the distances between the marks stored at the seventh step by using the previously stored equation or table.

5. The method of manufacturing a liquid crystal panel according to claim 1 wherein at least one of a target value of the relative position of the mark in the fourth step and a target value of the heating temperature at the fifth step is determined and stored from values of the error in the positions of the gravitational centers of the two sheets of glass substrates, the inclination between the substrates and the difference between the distances between the marks in the fourth step and change amounts of the values in the seventh step by using the previously stored equation or table.

6. The method of manufacturing a liquid crystal panel according to claim 1 wherein a dimension of the TET element or the color filter formed on the glass substrate is changed from the difference between the distances between the marks in the seventh step by using the previously stored equation or table.

7. The method of manufacturing a liquid crystal panel according to claim 1 wherein a dimension of the TFT element or the color filter formed on the glass substrate is changed such that the coordinates of the marks in the third step become previously stored coordinates of the marks.

8. The method of manufacturing a liquid crystal panel according to claim 1 wherein at least one of a target value of the relative position of the mark in the fourth step and a target value of the heating temperature in the fifth step is determined and stored from differences between the coordinates of the marks in the third step and previously stored coordinates of the marks by using the previously stored equation or table.

9. The method of manufacturing a liquid crystal panel according to claim 1 wherein in the seventh step, a target value of the heating temperature in the fifth step is determined and stored by measuring strain of the glass substrate and using the previously stored equation or table such that the strain amount becomes equal to or smaller than a predetermined value.

* * * * *